United States Patent
Tanaka et al.

(10) Patent No.: US 10,764,784 B2
(45) Date of Patent: Sep. 1, 2020

(54) WIRELESS COMMUNICATION DEVICE AND WIRELESS COMMUNICATION METHOD

(71) Applicant: Sony Corporation, Tokyo (JP)

(72) Inventors: Yusuke Tanaka, Tokyo (JP); Kosuke Aio, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/304,307

(22) PCT Filed: May 23, 2017

(86) PCT No.: PCT/JP2017/019119
§ 371 (c)(1),
(2) Date: Nov. 26, 2018

(87) PCT Pub. No.: WO2018/012114
PCT Pub. Date: Jan. 18, 2018

(65) Prior Publication Data
US 2019/0141577 A1    May 9, 2019

(30) Foreign Application Priority Data

Jul. 15, 2016   (JP) ................................ 2016-140343

(51) Int. Cl.
*H04W 28/12* (2009.01)
*H04W 76/15* (2018.01)
(Continued)

(52) U.S. Cl.
CPC .............. *H04W 28/12* (2013.01); *H04J 1/00* (2013.01); *H04J 11/00* (2013.01); *H04W 16/28* (2013.01);
(Continued)

(58) Field of Classification Search
CPC . H04W 28/12; H04W 72/10; H04W 72/0446; H04W 76/15; H04W 92/10; H04W 92/12
See application file for complete search history.

(56) References Cited

U.S. PATENT DOCUMENTS

| | | | |
|---|---|---|---|
| 2010/0220679 A1* | 9/2010 | Abraham | H04W 74/06 370/329 |
| 2015/0009921 A1 | 1/2015 | Papadopoulos | |
| 2015/0049730 A1 | 2/2015 | Merlin et al. | |

FOREIGN PATENT DOCUMENTS

| | | |
|---|---|---|
| EP | 2 966 924 A1 | 1/2016 |
| JP | 2015-502709 A | 1/2015 |

OTHER PUBLICATIONS

English-language translation of International Search Report and Written Opinion for International Application No. PCT/JP2017/019119, dated Jul. 11, 2017.

(Continued)

*Primary Examiner* — Jamal Javaid
(74) *Attorney, Agent, or Firm* — Xsensus LLP

(57) ABSTRACT

A wireless communication device includes: a transmission unit that transmits a request frame indicating a request for traffic information; a receiving unit that receives a response frame in which the traffic information is stored; and a control unit that controls transmission of a frame related to permission of transmission directed to a first wireless communication device that is identified on the basis of the traffic information stored in the received response frame and that is permitted to perform multiple access. A wireless communication device includes: a receiving unit that receives a request frame indicating a request for traffic information; a transmission unit that transmits a release frame is which the traffic information is stored in response to the received request frame; and a control unit that controls transmission (Continued)

of a frame related to the traffic information on the basis of a communication parameter related to multiple access.

16 Claims, 19 Drawing Sheets

(51) Int. Cl.
*H04W 72/10* (2009.01)
*H04W 84/12* (2009.01)
*H04W 92/10* (2009.01)
*H04W 92/12* (2009.01)
*H04W 72/04* (2009.01)
*H04W 72/12* (2009.01)
*H04W 16/28* (2009.01)
*H04J 1/00* (2006.01)
*H04J 11/00* (2006.01)

(52) U.S. Cl.
CPC ....... *H04W 72/0446* (2013.01); *H04W 72/10* (2013.01); *H04W 72/12* (2013.01); *H04W 76/15* (2018.02); *H04W 84/12* (2013.01); *H04W 92/10* (2013.01); *H04W 92/12* (2013.01)

(56) References Cited

OTHER PUBLICATIONS

Extended Search Report issued in European Application 17827247.2-1215 dated Apr. 30, 2019.

* cited by examiner

FIG. 3D

| AC Buffer Request | Alternative AC Buffer Request | Cumulative Buffer Request | Urgent Buffer Request |
|---|---|---|---|

FIG. 4D

| AC_BK | AC_BE | AC_VI | AC_A_VI | AC_A_VO | AC_VO | Cumulative Buffer | Urgent TID | Urgent Buffer | ved

WIRELESS COMMUNICATION DEVICE AND WIRELESS COMMUNICATION METHOD

CROSS-REFERENCE TO RELATED APPLICATIONS

This application is a National Stage Application based on PCT/JP2017/019119, filed on 23 May 2017, and claims priority to Japanese Patent Application No. 2016-140343, filed on 15 Jul. 2016, the entire contents of which being incorporated herein by reference.

TECHNICAL FIELD

The present disclosure relates to a wireless communication device and a wireless communication method.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of technologies for increasing the efficiency of communication, there are multiple access communication technologies. For example, the multiple access communication technologies include orthogonal frequency division multiple access (OFDMA), space division multiple access (SDMA) using multi-input multi-output (MIMO), or the like. The SDMA using MIMO is called multi-user MIMO (hereinafter, also referred to as MU-MIMO). Note that transmission of traffic may be scheduled in these multiple access communication technologies in some cases.

For example, Patent Literature 1 discloses an invention related to a method of performing MU-MIMO communication using grouping of user terminals, scheduling of a user terminal group, assignment of an OFDM resource to the user terminal group, assignment of an MU-MIMO transmission code to the user terminal group, and the assigned MU-MIMO transmission code.

CITATION LIST

Patent Literature

Patent Literature 1: JP 2015-502709T

SUMMARY OF INVENTION

Technical Problem

However, there is a concern that traffic that may disrupt delivery may occur in a case in which an access scheme of performing scheduling is additionally used in wireless communication (for example, wireless LAN communication) that is a conventional random access scheme in which scheduling is not performed. For example, in the random access scheme, traffic to be delivered is decided in a manner unique to each transmission source, and traffic decided upon a transmission opportunity that is acquired in an autonomously distributed manner is delivered. Meanwhile, although traffic is delivered on the basis of permission of transmission in the access scheme of performing scheduling, permission of transmission for a transmission source is decided irrespective of properties of traffic to be delivered by the transmission source. As a result permission of transmission may not be given to a transmission source that has more highly urgent traffic than traffic to be delivered by another transmission source, for example, and delivery of the highly urgent traffic may fail.

Thus, the present disclosure will provide a mechanism capable of suppressing disruption of delivery of traffic through wireless LAN communication.

Solution to Problem

According to the present disclosure, there is provided a wireless communication device including: a transmission unit that transmits a request frame indicating a request for traffic information; a receiving unit that receives a response frame in which the traffic information is stored; and a control unit that controls transmission of a frame related to permission of transmission directed to a first wireless communication device that is identified on the basis of the traffic information stored in the received response frame and that is permitted to perform multiple access.

In addition, according to the present disclosure, there is provided a wireless communication device including: a receiving unit that receives a request frame indicating a request for traffic information; a transmission unit that transmits a response frame in which the traffic information is stored in response to the received request frame; and a control unit that controls transmission of a game related to the traffic information on the basis of a communication parameter related to multiple access, which are stored in a frame related to permission of transmission that is received after the transmission of the response frame.

In addition, according to the present disclosure, there is provided a wireless communication method including, using a processor: transmitting a request frame that indicates a request for traffic information; receiving a response frame in which the traffic information is stored; and controlling transmission of a frame related to permission of transmission directed to a first wireless communication device that is identified on the basis of the traffic information stored in the received response frame and that is permitted to perform multiple access.

In addition, according to the present disclosure, there is provided a wireless communication method including, using a processor: receiving a request frame indicating a request for traffic information; transmitting a response frame in which the traffic information is stored in response to the received request frame; and controlling transmission of a frame related to the traffic information on the basis of a communication parameter related to multiple access, which are stored in a frame related to permission of transmission that is received after the transmission of the response frame.

Advantageous Effects of Invention

According to the present disclosure, a mechanism capable of suppressing disruption of delivery of traffic through wireless LAN communication is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3D is a diagram illustrating an example of an information element that is a component of a traffic information request frame according to the embodiment.

FIG. 4D is a diagram illustrating an example of an information element that is a component of a traffic information response frame according to the embodiment.

DESCRIPTION OF EMBODIMENTS

Figure 1:
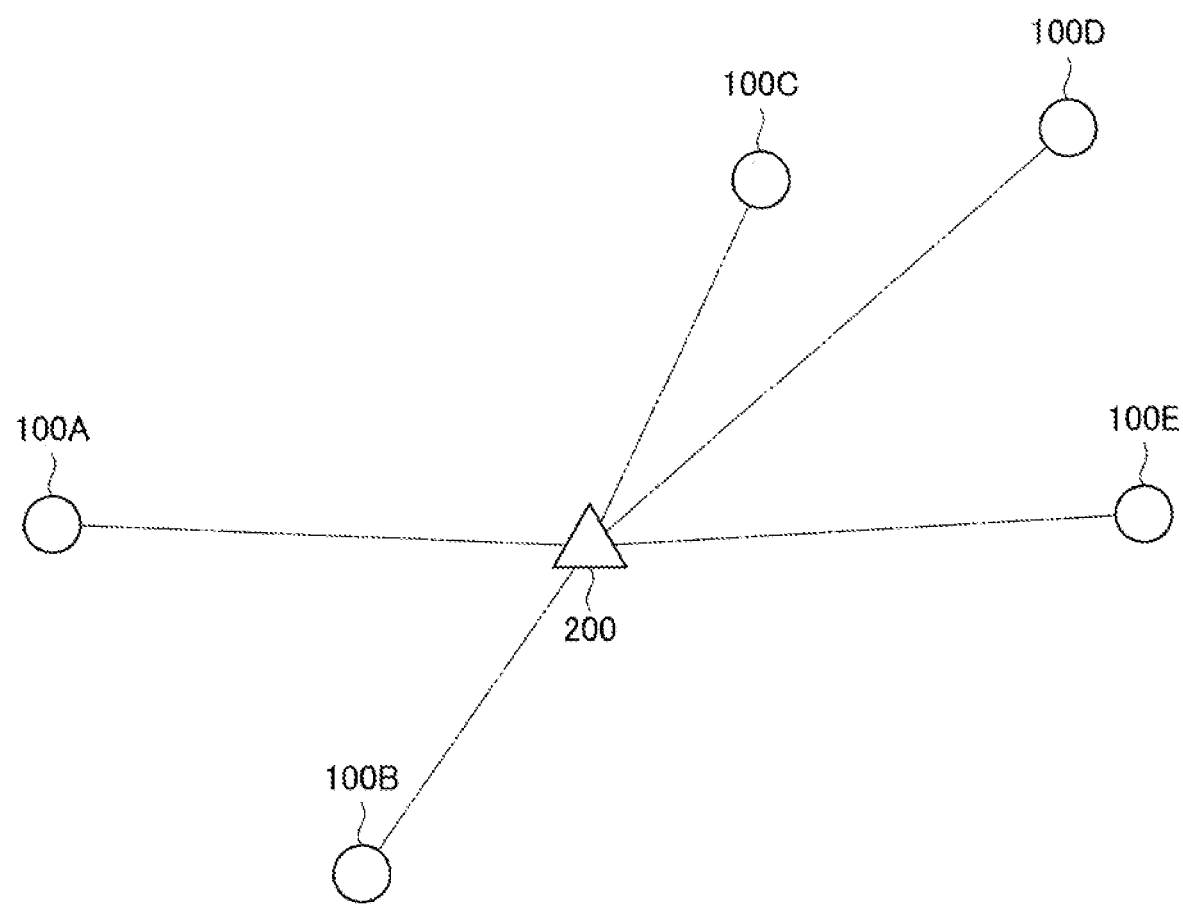
FIG. 1 is a diagram illustrating a configuration example of a wireless communication system according to each embodiment of the present disclosure.

Hereinafter, (a) preferred embodiment(s) of the present disclosure will be described in detail with reference to the appended drawings. Note that in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a STA 100A and a STA 100B. However, in a case where it is unnecessary to distinguish elements having substantially the same function, only the same reference numeral is added. For example, in a case where it is unnecessary to particularly distinguish the STA 100A and the STA 100B, they are simply referred to as "STAs 100."

In addition, the STAs 100 according to the first and second embodiments will be distinguished by adding numbers corresponding to the embodiments to the ends like an STA 100-1 and an STA-100-2 for convenience of description.

Note that description will be given in the following order.
1. Introduction
2. Configurations of System and Device
3. First Embodiment
3.1. Functions of Device
3.2. Flow of Processing
3.3 Summary of First Embodiment
4. Second Embodiment
4.1. Functions of Device
4.2. Flow of Processing
4.3. Summary of Second Embodiment
5. Application Example
6. Conclusion

1. Introduction

First, technologies in relation to a wireless communication device in each embodiment of the present disclosure will be described. The technologies include the aforementioned multiple access communication technologies. The multiple access communication technologies include downlink (hereinafter, also referred to as DL) multiple access communication in which signals are simultaneously transmitted from an access point (AP) to a plurality of stations (STAs) and uplink multiple access communication in which signals are simultaneously transmitted from a plurality of STAs to an AP. Here, downlink MU-MIMO, which is downlink multiple access communication, has already been defined as a communication standard (IEEE 802.11ac). Meanwhile, uplink multiple access communication is currently being examined and has not been defined as a communication standard. This is because wireless LAN communication is a communication system of a random access scheme while the uplink multiple access communication has properties that are close to those of communication that a plurality of specific STAs simultaneously perform, that is, communication of a so-called control access scheme. In the stage of reviewing, the uplink multiple access communication is considered to be realized by using trigger frames or the like for designating STAs that are permitted to perform uplink multiple access communication, communication periods, and the like.

Here, the STAs that are caused to simultaneously perform communication are grouped in multiple access communication. Further, it is desirable that the group of STAs be selected such that a target value of reception properties can be secured. For example, the AP is considered to select, as members of the same group, STAs for which transmission power and transmission time can be set such that reception power densities at the AP fall within a predetermined range.

However, there is a concern that traffic that disrupts delivery may occur even in multiple access communication in which grouping is performed as described above. For example, formation of a multiple access communication group is performed on the basis of communication parameters such as transmission power or transmission times of STAs, for example, regardless of properties of traffic to be delivered. Therefore, there are cases in which permission of transmission is not provided to STAs that have more highly urgent traffic than traffic that other STAs are scheduled to deliver, for example. As a result, delivery of the highly urgent traffic may fail.

Note that frames in which information related to traffic is communicated are defined in existing communicating standards. For example, communication of frames in which information elements such as traffic specifications (TSPEC) or traffic classification (TCLAS) that has information indicating priority of traffic are stored is defined. However, since notifications of the frames are provided by the STAs when communication is started, it is difficult to use traffic information indicated by the frames for forming the multiple access communication group by the AP. Also, since one piece of traffic information is indicated by each frame, a large amount of communication overhead is needed in order to share a plurality of pieces of traffic information among the STAs and the AP.

Thus, the present disclosure will propose a wireless communication system capable of suppressing disruption of delivery of traffic through wireless LAN communication and a wireless communication device for realizing the wireless communication system.

2. Configurations of System and Device

Next, configurations of the wireless communication system according to each embodiment of the present disclosure and of the wireless communication device for realizing the wireless communication system will be described. First, the configuration of the wireless communication system will be described with reference to FIG. 1. FIG. 1 is a diagram illustrating a configuration example of the wireless communication system according to each embodiment of the present disclosure.

As illustrated in FIG. 1, the wireless communication system includes an AP 200 and a plurality of STAs 100 as wireless communication devices. For example, the AP 200 and the respective STAs 100A to 100E can communicate with each other and perform communication after establishing connection for communication.

Figure 2:
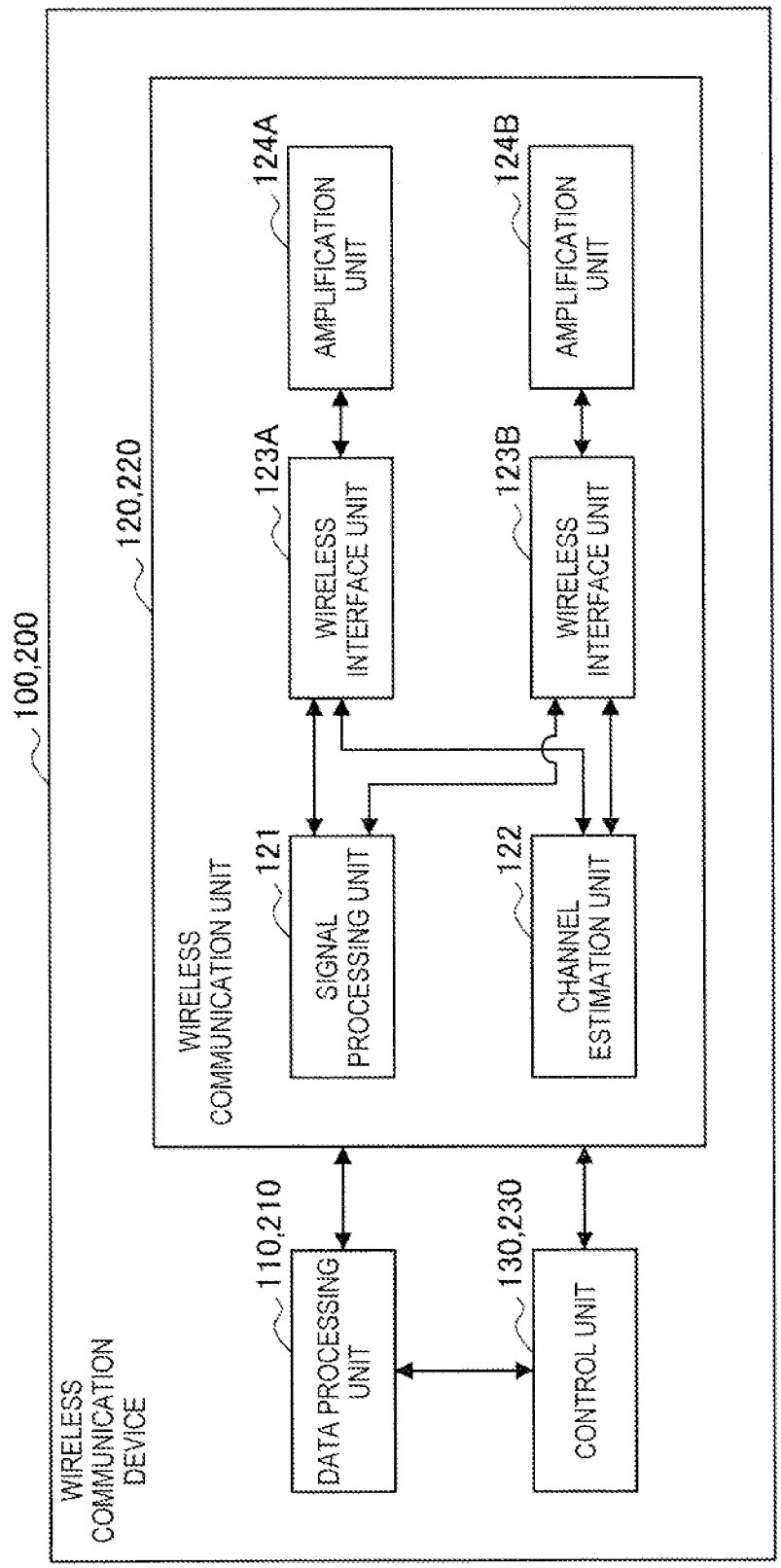
FIG. 2 is a block diagram schematically illustrating functional configurations of an STA and an AP according to each embodiment of the present disclosure.

Next, functional configurations and basic functions of the STAs 100 and the AP 200 will be described with reference to FIG. 2. FIG. 2 is a block diagram schematically illustrating an example of the functional configurations of the STAs 100 and the AP 200 according to each embodiment of the present disclosure. Note that since the functional configurations of the STAs 100 and the AP 200 are substantially the same, only the STAs 100 will be described.

As illustrated in FIG. 2, each of the STAs 100 includes a data processing unit 110, a wireless communication unit 120, and a control unit 130. Note that a power source unit that supplies electric power to the respective functions is provided in each of the STAs 100 although they are not illustrated in the drawing. The power source unit is realized by a fixed power source, a battery, or the like.

(Data Processing Unit)

The data processing unit 110 performs processing for transmitting and receiving data. Specifically, the data processing unit 110 generates a frame (or a packet) on the basis of data from a higher communication layer and provides the generated frame to a signal processing unit 121, which will be described later. For example, the data processing unit 110 performs processing of generating a frame from data and adding a media access control (MAC) header for MAC or adding a detection code or the like to the generated frame. Also, the data processing unit 110 extracts data from a received frame and provides the extracted data to a higher communication layer. For example, the data processing unit 110 acquires data by performing, on the received frame, analysis of the MAC header, code error detection and collection, reordering processing, and the like.

(Wireless Communication Unit)

The wireless communication unit 120 includes a signal processing unit 121, a channel estimation unit 122, a wireless interface unit 123, and an amplification unit 124 as illustrated in FIG. 2.

The signal processing unit 121 performs modulation processing on a frame. Specifically, the signal processing unit 121 generates a symbol stream by performing encoding, interleaving, and modulation on a frame provided from the data processing unit 110 in accordance with coding and a modulation scheme set by the control unit 130. In addition, the signal processing unit 121 acquires a frame by performing demodulation, decoding, or the like on a symbol stream obtained through spatial processing and provides the acquired frame to the data processing unit 110 or the control unit 130.

In addition, the signal processing unit 121 performs processing related to space division multiplexing communication. Specifically, the signal processing unit 121 performs signal processing related to space separation on the generated symbol stream and provides each symbol stream obtained through the processing to the wireless interface unit 123. Also, the signal processing unit 121 performs spatial processing, for example, separation processing or the like of a symbol stream on a symbol stream related to a signal obtained from the wireless interface unit 123.

In addition, the signal processing unit 121 may perform other processing related to multiplexing communication. For example, the signal processing unit 121 may perform processing related to frequency division multiplexing communication, orthogonal frequency division multiplexing communication, or code division multiplexing communication.

The channel estimation unit 122 estimates a channel gain. Specifically the channel estimation unit 122 calculates complex channel gain information from a preamble part or a training signal part of the signal related to the symbol stream obtained from the wireless interface unit 123. Note that the calculated complex channel gain information is provided to the signal processing unit 121 via the control unit 130 or directly and is then used for modulation processing, space separation processing, and the like.

The wireless interface unit 123 generates signals to be transmitted and received via an antenna. Specifically, the wireless interface unit 123 converts a signal related to a symbol stream prowled from the signal processing unit 121 into an analog signal, performs filtering thereon, and performs frequency up-converting. Then, the wireless interface unit 123 provides the obtained signal to the amplification unit 124. Also, the wireless interface unit 123 performs processing, which is opposite to that in signal transmission, for example, frequency down-converting, digital signal conversion, or the like on the signal obtained from the amplification unit 124 and provides the signal obtained through the processing to the channel estimation unit 122 and the signal processing unit 121.

The amplification unit 124 amplifies the signal. Specifically, the amplification unit 124 amplifies the analog signal provided from the wireless interface unit 123 to predetermined electric power and causes the signal obtained through the amplification to be transmitted via the antenna. Also, the amplification unit 124 amplifies a signal related to electric waves received via the antenna to predetermined electric power and provides the signal obtained through the amplification to the wireless interface unit 123. The amplification unit 124 is realized by a power amplification module, for example. Note that either or both of a function of amplifying transmission electric waves and a function of amplifying reception electric waves of the amplification unit 124 may be incorporated in the wireless interface unit 123.

Note that, although FIG. 2 describes the example of the configurations (the wireless interface units 123A and 123B and the amplification units 124A and 124B) in a case in which two antennas are provided in each STA 100, the number of antennas provided may be three or more or may be one.

(Control Unit)

The control unit 130 controls overall operations of each STA 100. Specifically, the control unit 130 performs processing such as exchange of information between the respective functions, setting of communication parameters, and scheduling of a frame in the data processing unit 110. In particular, the control unit 130 controls a response of traffic information to a request for traffic information, transmission of traffic designated by the AP 200, and the like. Also, in a case in which the wireless communication device operates as the AP 200, the control unit 230 controls a request for traffic information, designation of STAs 100 that are permitted to perform transmission and traffic based on traffic information, and the like.

3. First Embodiment

Next, a first embodiment of the present disclosure will be described. In the first embodiment, an AP 200-1 requests an STA 100-1 (first wireless communication device) to send traffic information, and the STA 100-1 provides a notification of the traffic information in response to the request from the AP 200-1. Then, the AP 200-1 forms a multiple access communication group on the basis of the traffic information provided in the notification.

3.1. Functions of Device

First, the respective functions of the STAs 100-1 and an AP 200-1 that serve as wireless communication devices according to the embodiment will be described.

(Request for Traffic Information)

The AP 200-1 requests traffic information from the STA 100-1. Specifically, a control unit 230 controls transmission of a frame indicating a request for traffic information (hereinafter, also referred to as a traffic information request frame). In a case in which multiple access communication is executed, for example, the control unit 230 causes a data processing unit 210 to generate a traffic information request frame in which information indicating traffic for requesting transmission (hereinafter, also referred to as requested traffic information) is stored, and the generated traffic information request frame is transmitted by a wireless communication unit 220. The traffic information request frame may be individually transmitted to the STA 100-1 or may be transmitted by using broadcasting, multicasting, or multiple access communication.

As the requested traffic information, there is information indicating whether or not traffic is present or the amount thereof. Specifically, the traffic information is information related to traffic in accordance with a specific priority, information related to a sum of amounts of traffic, or information related to traffic regarding urgency of delivery. Components of the traffic information request frame will be described with reference to FIGS. 3A to 3D. FIGS. 3A to 3D are diagrams illustrating examples of information elements that are components of the traffic information request frame.

Figure 3A:
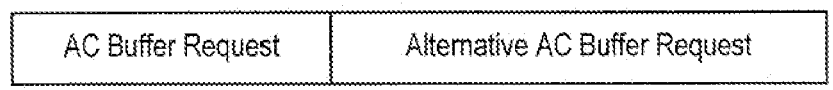
FIG. 3A is a diagram illustrating an example of information elements that are components of a traffic information request frame according to a first embodiment of the present disclosure.

As the information related to traffic in accordance with a specific priority, there is information indicating whether or not traffic corresponding to an access category is present or the amount thereof. Further, the access categories include a first access category and a second access category. For example, bit information indicating whether or not traffic that belongs to an access category of which use is essential (hereinafter, also referred to as an essential access category (AC)) is present is stored in a field AC Butter Request of an information element as illustrated in FIG. 3A as the requested traffic information. Also, bit information indicating whether or not traffic that belongs to an access category of which use is arbitrary (hereinafter, also referred to as an arbitrary AC) is present is stored in a field Alternative AC Butter Request of an information element as illustrated in FIG. 3A.

Figure 3B:
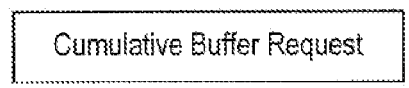
FIG. 3B is a diagram illustrating an example of an information element that is a component of a traffic information request frame according to the embodiment.

Also, the information related to a sum of amounts of traffic includes information indicating a sum of amounts of all or a part of traffic that the STA 100-1 holds. For example, bit information indicating a request for the total amount of traffic that the STA 100-1 holds is stored in a field Cumulative Buffer Request of an information element as illustrated in FIG. 3B as the requested traffic information.

Figure 3C:
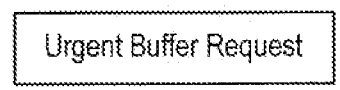
FIG. 3C is a diagram illustrating an example of an information element that is a component of a traffic information request frame according to the embodiment.

In addition, the information related to traffic regarding urgency includes information indicating whether or not traffic that will be discarded in a time that is equal to or less than a threshold value, traffic with an allowable delay that is equal to or less than a threshold value, traffic regarding communication control, or traffic that is designated by a generation source of the traffic is present or the amount thereof. For example, bit information indicating a request for all or a part of the information related to traffic regarding urgency is stored in a field Urgent Buffer Request of an information element as illustrated in FIG. 3C as the requested traffic information. Note that the information stored in the field may indicate which of the aforementioned pieces of information related to traffic regarding urgency is requested. For example, combinations of a plurality of pieces of bit information may be stored in the field, and types of the information related to traffic regarding urgency may be identified on the basis of values indicated by the combinations of the plurality of pieces of bit information.

Note that, in a case in which a request for a plurality of types of traffic information is decided, information indicating the request for the plurality of pieces of traffic information may be stored in the traffic information request frame. For example, an information element obtained by integration of at least two of the aforementioned plurality of information elements may be used as illustrated in FIG. 3D.

(Response of Traffic Information)

The STA 100-1 provides a notification of traffic information in response to a request from the AP 200-1. Specifically, the control unit 130 controls transmission of a frame in which traffic information is stored (hereinafter, also referred to as a traffic information response frame) in response to a received traffic information request frame. For example, if a traffic information request frame is received, the control unit 130 determines whether or not traffic requested through the traffic information request frame is held by a transmission buffer or the like. If it is determined that the requested traffic is held, the control unit 130 generates traffic information indicating whether or not the held traffic is present or the amount thereof. Then, the control unit 130 causes the data processing unit 110 to generate a traffic information response frame in which the generated traffic information is stored, and the generated traffic information response frame is transmitted by the wireless communication unit 120.

Here, the traffic information response frame is a frame used for another purpose. Specifically, the traffic information is stored as an information element in a part of the frame used for another purpose. Note that the traffic information response frame may be a dedicated frame for the response of the traffic information. In addition, the traffic information response frame may be individually transmitted to the AP 2001 from each STA 100-1 or may be simultaneously transmitted to the AP 200-1 by using multiple access communication. Further, components of the traffic information response frame will be described with reference to FIGS. 4A to 4D. FIGS. 4A to 4D are diagrams illustrating examples of information elements that are components of the traffic information response frame.

Figure 4A:
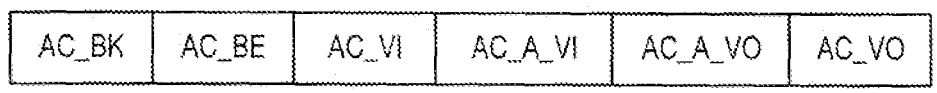
FIG. 4A is a diagram illustrating an example of an information element that is a component of a traffic information response frame according to the embodiment.

In a case in which information related to traffic in accordance with a specific priority is requested, the control unit 130 determines whether or not traffic corresponding to the specific priority is present or the amount thereof. Specifically, the control unit 130 determines whether or not traffic corresponding to the first or second access category is present or the amount thereof. Then, the control unit 130 causes the data processing unit 110 to store the determined information indicating whether or not the traffic is present or the amount thereof in a specific information element of the traffic information response frame. For example, bit information indicating a request for whether or not traffic that belongs to the essential AC is present is stored in AC_BK, AC_BE, AC_VI, or AC-VO of an information element as illustrated in FIG. 4A. Also, bit information indicating a request for whether or not traffic that belongs to the arbitrary AC is present is stored in a field AC_A_VI or AC_A_VO of an information element as illustrated in FIG. 4A. Note that information indicating the amount of traffic corresponding to each access category may be stored instead of the bit information.

Figure 4B:
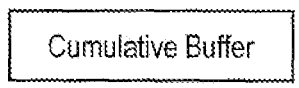
FIG. 4B is a diagram illustrating an example of an information element that is a component of a traffic information response frame according to the embodiment.

In addition, in a case in which information related to a sum of amounts of traffic is requested, the control unit 130 calculates the total amount of traffic related to the request. Then, the control unit 130 causes the data processing unit 110 to store information indicating the calculated total amount of traffic in a specific information element of the traffic information response frame. For example, information indicating the total amount of traffic that the STA 100-1 holds is stored in a field Cumulative Buffer of an information element as illustrated in FIG. 4B.

Figure 4C:
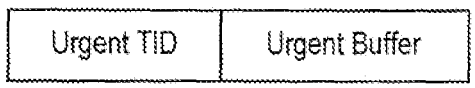
FIG. 4C is a diagram illustrating an example of an information element that is a component of a traffic information response frame according to the embodiment.

In addition, in a case in which information related to traffic regarding urgency of delivery is requested, the control unit 130 determines whether or not traffic regarding urgency is present and the amount thereof. Specifically, the control unit 130 determines whether or not traffic that is discarded in a time that is equal to or less than a threshold value, traffic with an allowable delay that is equal to or less than a threshold value, or traffic related to communication control is present and the amount thereof. Then, the control unit 130 causes the data processing unit 110 to store the determined information indicating whether or not the traffic is present and the amount thereof in a specific information element of the traffic information response fame. For example, information indicating an identification ID of the determined traffic (for example, a traffic identifier (TID)) regarding urgency is stored in a field Urgent TID of an information element as illustrated in FIG. 4C. Also, information indicating the amount of traffic is stored in a field Urgent Buffer of an information element as illustrated in FIG. 4C.

Note that, in a case in which a plurality of types of traffic information are requested, a plurality of pieces of traffic information may be stored in the traffic information request frame. As illustrated in FIG. 4D, for example, an information element obtained by integration of at least two of the aforementioned plurality of information elements may be used.

(Decision of Target that is Permitted to Perform Transmission)

The AP 200-1 identifies STAs 100-1 that are allowed to perform multiple access on the basis of traffic information. Specifically, the control unit 230 decides traffic that is permitted to be transmitted on the basis of traffic information provided in notifications from the STAs 100-1. Then, the control unit 230 decides the STAs 100-1 that have the traffic that is permitted to be transmitted as members of a multiple access communication group. For example, the control unit 230 determines the STAs 100-1 that have predetermined traffic by using the traffic information as will be described later and decides the determined STAs 100-1 as members of a multiple access communication (for example, space division multiple access communication) group.

In a case in which the traffic information is information related to traffic in accordance with a specific priority, the control unit 230 determines whether or not the STAs 100-1 that have provided the notifications of the traffic information have the traffic in accordance with a specific priority. For example, the control unit 230 determines whether or not the traffic information indicates presence of traffic that belongs to a predetermined category (for example, AC_VO with the highest priority in essential ACs), namely either the first or second access category.

In addition, in a case in which the traffic information is information related to a sum of amounts of traffic, the control unit 230 determines whether or not the amounts of traffic that the STAs 100-1 that have provided the notifications of the traffic information have are equal to or greater than a threshold value. For example, the control unit 230 determines whether or not the total amount of traffic that the traffic information indicates is equal to or greater than the threshold value. Note that relative comparison with other STAs 100-1 may be used instead of the threshold value. For example, groups of the STAs 100-1 may be divided into a higher group and a lower group in ranking of the total amounts of traffic, and it may be determined which of the groups each of the STAs 100-1 belongs to.

In addition, in a case in which the traffic information is information related to traffic regarding urgency of delivery, the control unit 230 determines whether or not the STAs 100-1 that have provided the notifications of the traffic information have traffic regarding urgency. For example, the control unit 230 determines whether or not the traffic information is values indicating presence of traffic regarding urgency. Also, it is determined whether or not the amounts of traffic regarding urgency that the traffic information indicates are equal to or greater than a threshold value. Note that relative comparison with other STAs 100-1 may be used instead of the threshold value.

(Notification of Permission of Transmission)

The AP 200-1 transmits a frame related to permission of transmission to the specified STAs 100-1. Specifically, the control unit 230 causes the data processing unit 210 to generate transmission permission frames directed to the STAs 100-1 that are the members of the multiple access communication group. Then, the generated transmission permission frames are transmitted by the wireless communication unit 220. For example, the control unit 230 causes the data processing unit 210 to generate trigger frames directed to the STAs 100-1 decided as the members of the multiple access communication group. Then, the wireless communication unit 220 transmits the generated trigger frames.

Information with which traffic that is permitted to be transmitted is designated (hereinafter, also referred to as designated traffic information) is stored in the transmission permission frames. Specifically designated traffic information indicating traffic that is permitted to be transmitted as described above is stored in trigger frames. For example, TIDs or the like of the traffic that is permitted to be transmitted are stored as the designated traffic information. Note that communication parameter information used in the multiple access communication is also stored in the transmission permission frames.

Note that, although the example in which the notifications of the multiple access communication group are provided to the STAs 100-1 through the transmission of the transmission permission frames has been described above, the notifications of the multiple access communication group may be provided by using frames that are different from the transmission permission frames. For example, dedicated frames for providing notifications of the multiple access communication group or some of fields of frames used for another propose may be used. Also, notifications of the designated traffic information may be provided along with the notifications of the multiple access communication group.

(Multiple Access Communication)

Each STA 100-1 controls transmission of frames on the basis of frames related to permission of transmission. Specifically, the control unit 130 controls transmission of a frame related to traffic information on the basis of communication parameters that are stored in the received transmission permission frame. For example, if a trigger frame is received, the data processing unit 110 determines whether or not a target of the permission of transmission that information stored in the trigger frame indicates is the STA 100-1 itself. If it is determined that the target of the permission of transmission is the STA 100-1 itself, the data processing unit 110 acquires communication parameter information and designated traffic information stored in the trigger frame, and the control unit 130 sets communication parameters such as transmission power and a modulation and coding set (MCS) on the basis of the acquired communication parameter information. If a transmission period that the acquired communication parameter information indicates has been reached, then the control unit 130 causes the data processing unit 110 to generate traffic in which the traffic designated by the designated traffic information is stored, and the generated frame is transmitted by the wireless communication unit 120. Such processing is similarly performed on the other STAs 100-1 that are also targets of permission of transmission. As a result, frames transmitted from the respective STAs 100-1 are multiplexed, and the multiple access communication is thus realized.

The AP 200-1 receives frames that are transmitted from the plurality of STAs 100-1 after the transmission of the trigger frame and are then multiplexed. Specifically, the wireless communication unit 220 separates the respective frames from a multiplexed frame received after the transmission of the trigger frame, and the data processing unit 210 performs reception processing on the separated frames. Then, data obtained through the reception processing is provided to a higher communication layer, the control unit 230, or the like.

3.2. Flow of Processing

Figure 5:
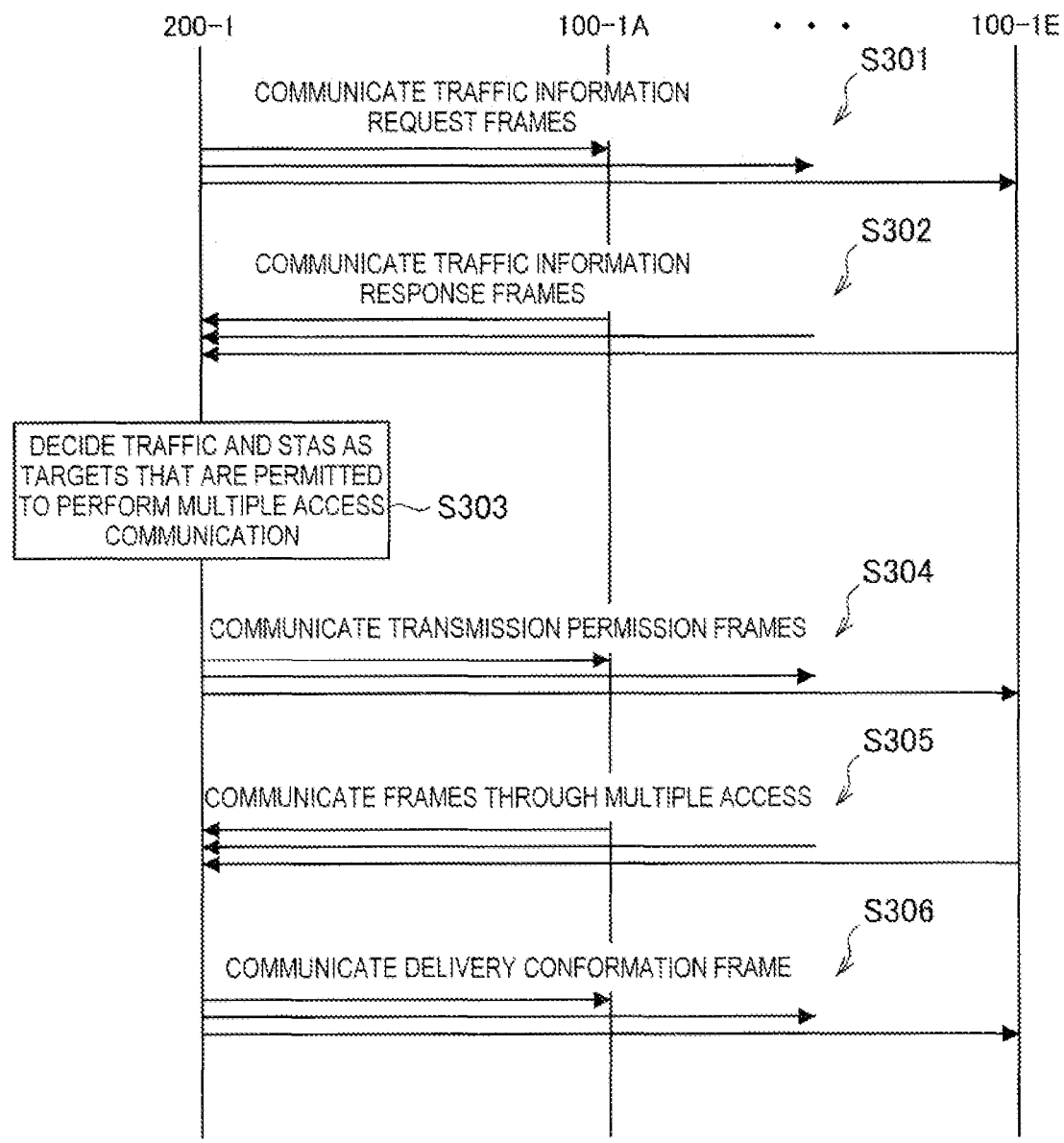
FIG. 5 is a sequence diagram schematically illustrating an example of the wireless communication system according to the embodiment.

Next, a flow of processing of the wireless communication system according to the embodiment will be described with reference to FIG. 5. FIG. 5 is a sequence diagram conceptually illustrating an example of the processing of the wireless communication system according to the embodiment.

The AP 200-1 transmits traffic information request frames (Step S301). The STAs 100-1A to 100-1E that have received the traffic information request frames transmit the traffic information response frames to the AP 200-1 (Step S302). The AP 200-1 that has received the traffic information response frames decides traffic and STAs 100-1 that become targets of permission of multiple access communication (Step S303). Then, the AP 200-1 transmits transmission permission frames to the decided STAs 100-1 (Step S304). Frames are multiplexed by the STAs 100-1A to 100-1E that have received the transmission permission frames transmitting the frames in accordance with communication parameters (Step S305). The AP 200-1 that has received the multiplexed frames transmits the delivery confirmation frames to the STAs 100-1A to 100-1E (Step S306).

Then, processing of the STAs 100-1 and the AP 200-1 according to the embodiment will be individually described.

(Processing of AP)

Figure 6:
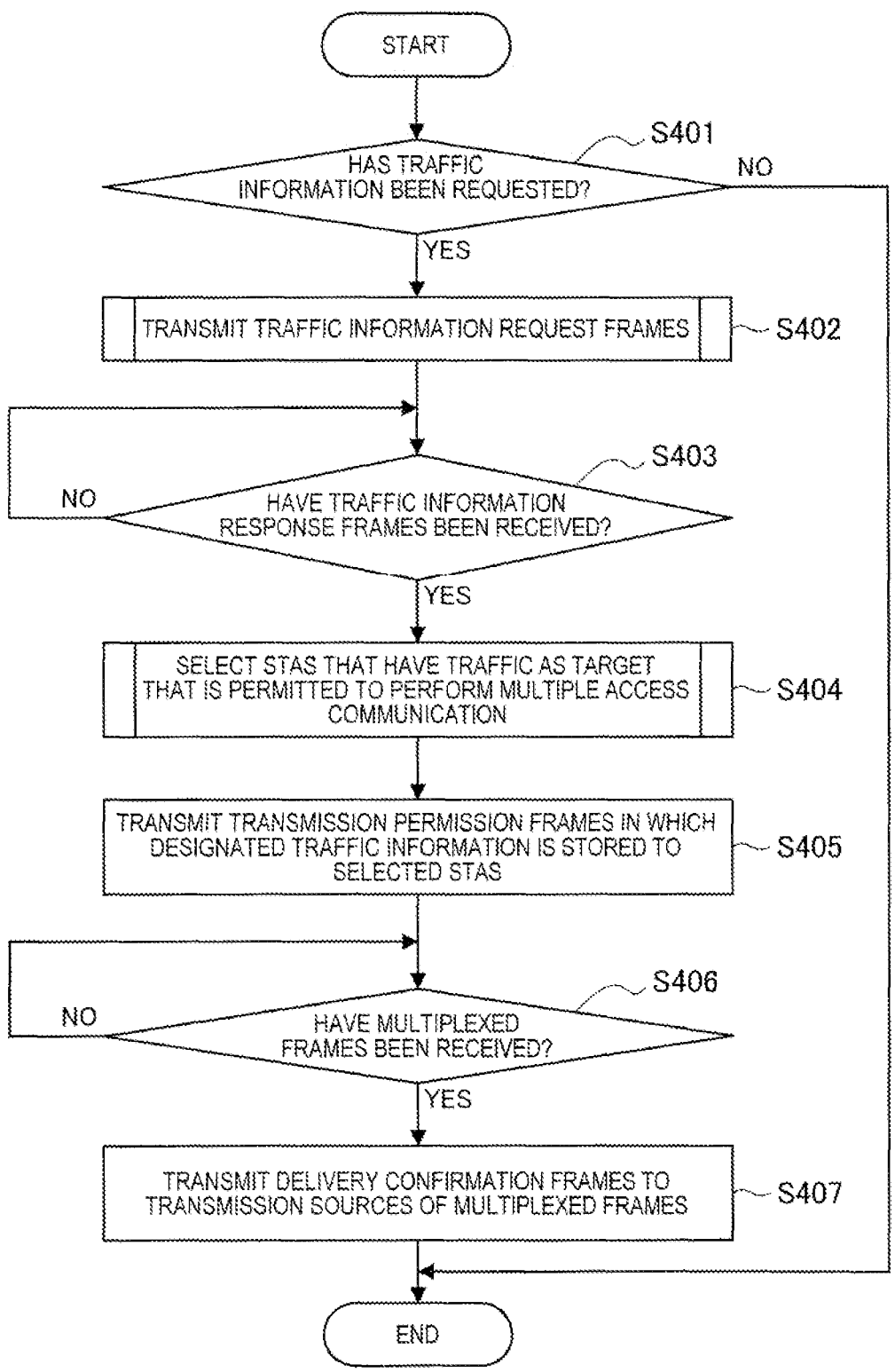
FIG. 6 is a flowchart conceptually illustrating an example of overall processing of the AP according to the embodiment.

First overall processing of the AP 200-1 will be described with reference to FIG. 6. FIG. 6 is a flowchart conceptually illustrating an example of overall processing of the AP 200-1 according to the embodiment.

The AP 200-1 determines whether or not to request traffic information (Step S401). Specifically the control unit 230 determines whether or not traffic information is present. In a case in which traffic information has been acquired in the past, for example, the control unit 230 may determine not to request the traffic information. Also, the control unit 230 may determine to request the traffic information when a predetermined time has elapsed after acquisition even in a case in which the traffic information has been acquired in the past.

If it is determined to request the traffic information (Step S401/YES), the AP 200-1 transmits traffic information request frames (Step S402). Specifically, the control unit 230 causes the data processing unit 210 to generate traffic information request frames in which the requested traffic information is stored, and the generated traffic information request frames are transmitted by the wireless communication unit 220. Note that details will be described later.

Next, the AP 200-1 determines whether or not the traffic information response frames have been received (Step S403). Specifically, the data processing unit 210 determines whether or not the traffic information response frames have been received by the wireless communication unit 220 as responses to the traffic information request frames.

If it is determined that the traffic information response frames have been received (Step S403/YES), the AP 200-1 selects the STAs 100-1 that have traffic that is a target of permission of multiple access communication (Step S404). Specifically, the data processing unit 210 acquires traffic information from the received traffic information response frames, and the control unit 230 decides the traffic and the STAs that are allowed to perform multiple access communication on the basis of the acquired traffic information. Note that details will be described later.

Next, the AP 200-1 transmits the transmission permission frames in which the designated traffic information is stored to the STAs 100-1 (Step S405). Specifically, the control unit 230 causes the data processing unit 210 to generate trigger frames in which designated traffic information indicating traffic that is permitted to be transmitted through multiple access communication is stored, and the generated trigger frames are transmitted by the wireless communication unit 220.

Thereafter, the AP 200-1 determines whether or not multiplexed frames have been received (Step S406). Specifically, the control unit 230 determines whether or not multiplexed frames have been received in a transmission period that has been provided in notification through the trigger frames after transmission of the trigger frames.

If it is determined that a multiplexed frame has been received (Step S406/YES), the AP 200-1 transmits a delivery confirmation frame to a transmission source of the multiplexed frame (Step S407). Specifically, the wireless communication unit 220 receives multiplexed frames and separates the respective frames. Then, the data processing unit 210 performs reception processing on the respective frames obtained through the separation and provides data obtained through the reception processing to the higher communication layer or the control unit 230. In addition, if the frames are received by the wireless communication unit 220, the control unit 230 causes the data processing unit 210 to generate acknowledgement (ACK) frames directed to transmission sources of the received frames and causes the wireless communication unit 220 to transmit the generated ACK frames.

Figure 7:
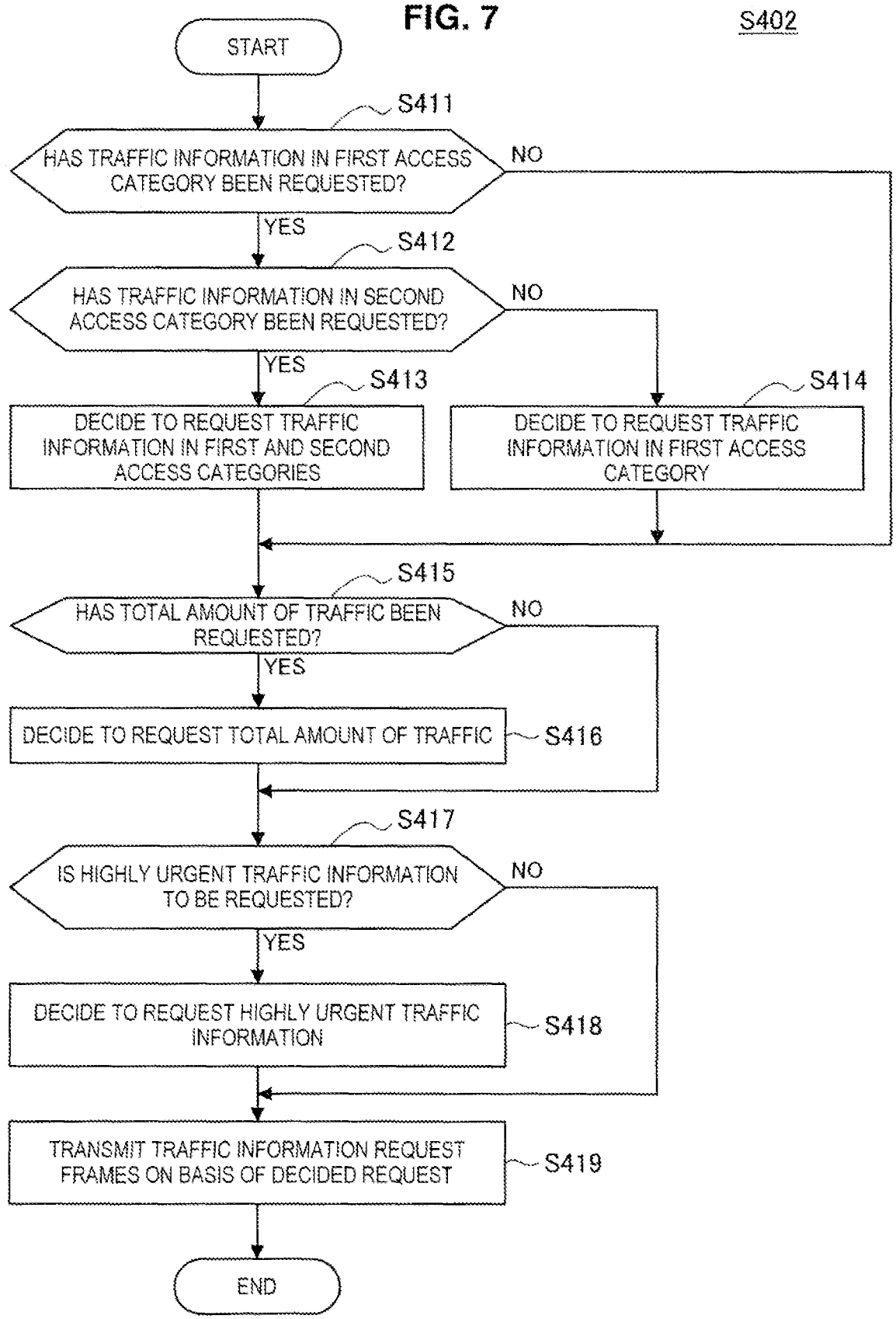
FIG. 7 is a flowchart conceptually illustrating an example of processing of transmitting a traffic information request frame in an AP according to the embodiment.

Next, processing of transmitting traffic information request frames performed by the AP 200-1 will be described with reference to FIG. 7. FIG. 7 is a flowchart conceptually illustrating an example of processing of transmitting traffic information request frames performed by the AP 200-1 according to the embodiment.

The AP 200-1 determines whether or not to request traffic information in the first access category (Step S411). Specifically, the control unit 230 determines whether or not to request information indicating whether or not traffic that belongs to the essential AC is present and the amount thereof.

If it is determined to request traffic information in the first access category (Step S411/YES), the AP 200-1 determines whether or not to request traffic information in the second access category (Step S412). Specifically the control unit 230 determines whether or not to request information indicating whether or not traffic that belongs to the arbitrary AC is present or the amount thereof.

If it is determined to request the traffic information in the second access category (Step S412/YES), the AP 200-1 decides to request the traffic information in the first and second access categories (Step S413). Specifically, the control unit 230 generates requested traffic information indicating whether or not traffic that belongs to either the essential AC or the arbitrary AC is present or the amount thereof.

Meanwhile, if it is determined not to request the traffic information in the second access category (Step S412/NO), the AP 200-1 decides to request only the traffic information in the first access category (Step S414). Specifically, the control unit 230 generates requested traffic information indicating requests for information indicating whether or not traffic that belongs to the essential AC is present or the amount thereof.

In addition, the AP 200-1 determines whether or not to request the total amount of traffic (Step S415). Specifically, the control unit 230 determines whether or not to request the total amount of traffic held.

If it is determined to request the total amount of traffic (Step S415/YES), the AP 200-1 decides to request the total amount of traffic (Step S416). Specifically, the control unit 230 generates requested traffic information indicating the request for the total amount of traffic held.

In addition, the AP 200-1 determines whether or not to request highly urgent traffic information (Step S417). Specifically, the control unit 230 determines whether or not to request information indicating whether or not traffic regarding urgency of delivery is present and the amount thereof. Note that details will be described later.

If it is determined to request highly urgent traffic information (Step S417/YES), the AP 200-1 decides to request highly urgent traffic information (Step S418). Specifically, the control unit 230 generates requested traffic information indicating requests for information indicating whether or not highly urgent traffic is present and the amount thereof.

Them the AP 200-1 transmits traffic information request frames on the basis of the decided requests (Step S419). Specifically, the control unit 230 causes the data processing unit 210 to generate traffic information request frames that have generated requested traffic information as information elements, and the generated traffic information request frames are transmitted by the wireless communication unit 220.

Figure 8:
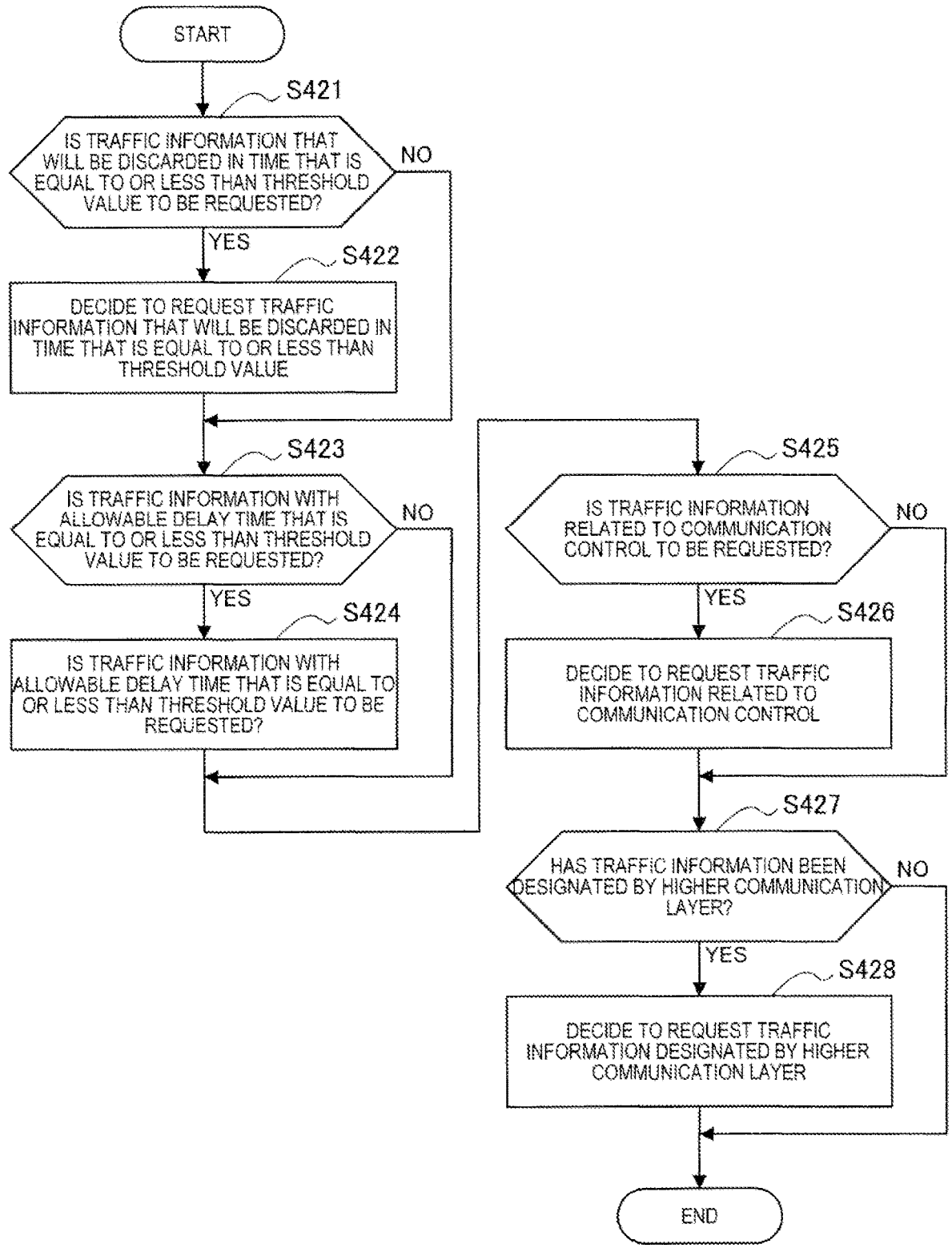
FIG. 8 is a flowchart conceptually illustrating an example of processing of requesting highly urgent traffic information in the AP according to the embodiment.

Further, processing of requesting for highly urgent traffic information performed by the AP 200-1 will be described with reference to FIG. 8. FIG. 8 is a flowchart conceptually illustrating an example of processing of requesting for highly urgent traffic information performed by the AP 200-1 according to the embodiment.

The AP 200-1 determines whether or not to request traffic information that will be discarded in a time that is equal to or less than a threshold value (Step S421). Specifically, the control unit 230 determines whether or not to request information indicating whether or not traffic that will be discarded in times that are set in buffered traffic and are equal to or less than a threshold value is present and the amount thereof.

If it is determined to request the traffic information that will be discarded in a time that is equal to or less than the threshold value (Step S421/YES), the AP 200-1 decides to request the traffic information that will be discarded in the time that is equal to or less than the threshold value (Step S422). Specifically, the control unit 230 generates requested traffic information indicating requests for information indicating whether or not traffic that will be discarded in times that are equal to or less than the threshold value is present and the amount thereof. Note that information indicating the threshold value of the times in which the traffic is discarded may be stored in the requested traffic information.

In addition, the AP 200-1 determines whether or not to request traffic information with an allowable delay time that is equal to or less than a threshold value (Step S423). Specifically, the control unit 230 determines whether or not to request information indicating whether or not traffic with an allowable delay time that is set in buffered traffic and is equal to or less than a threshold value is present and the amount thereof.

If it is determined to request the traffic information with an allowable delay time that is equal to or less than the threshold value (Step S423/YES), the AP 200-1 decides to request the traffic information with an allowable delay time that is equal to or less than the threshold value (Step S424). Specifically, the control unit 230 generates requested traffic information indicating requests for information indicating whether or not traffic with an allowable delay time that is equal to or less than the threshold value is present and the amount thereof. Note that information indicating the threshold value of the allowable delay time may be stored in the requested traffic information.

In addition, the AP 200-1 determines whether or not to request traffic information related to communication control (Step S425). Specifically, the control unit 230 determines whether or not to request information indicating whether or not traffic is present and the amount thereof such as clock time notifications, delivery confirmation requests, delivery confirmation, connection requests, and connection permission.

If it is determined to request the traffic information related to communication control (Step S425/YES), the AP 200-1 decides to request for traffic information related to communication control (Step S426). Specifically, the control unit 230 generates requested traffic information indicating requests for information indicating whether or not traffic related to communication control is present and the amount thereof. Note that the information indicating the types of the traffic related to communication control may be stored in the requested traffic information.

In addition, the AP 200-1 determines whether or not traffic information has been designated from the higher communication layer (Step S427). Specifically the control unit 230 determines whether or not to request information indicating whether or not traffic designated as traffic with urgency by an application is present and the amount thereof. For example, the traffic designated by the application may be traffic for an urgent alert or data generated by an application related to communication with a high-speed moving substance. Note that the traffic may not be explicitly designated and may be designated indirectly. For example, the designated traffic may be traffic input from a specific application.

If it is determined that the traffic information has been designated from the higher communication layer (Step S427/YES), the AP 200-1 decides to request for the traffic information designated from the higher communication layer (Step S428). Specifically, the control unit 230 generates requested traffic information indicating requests for information indicating whether or not traffic designated from the application is present and the amount thereof.

Figure 9:
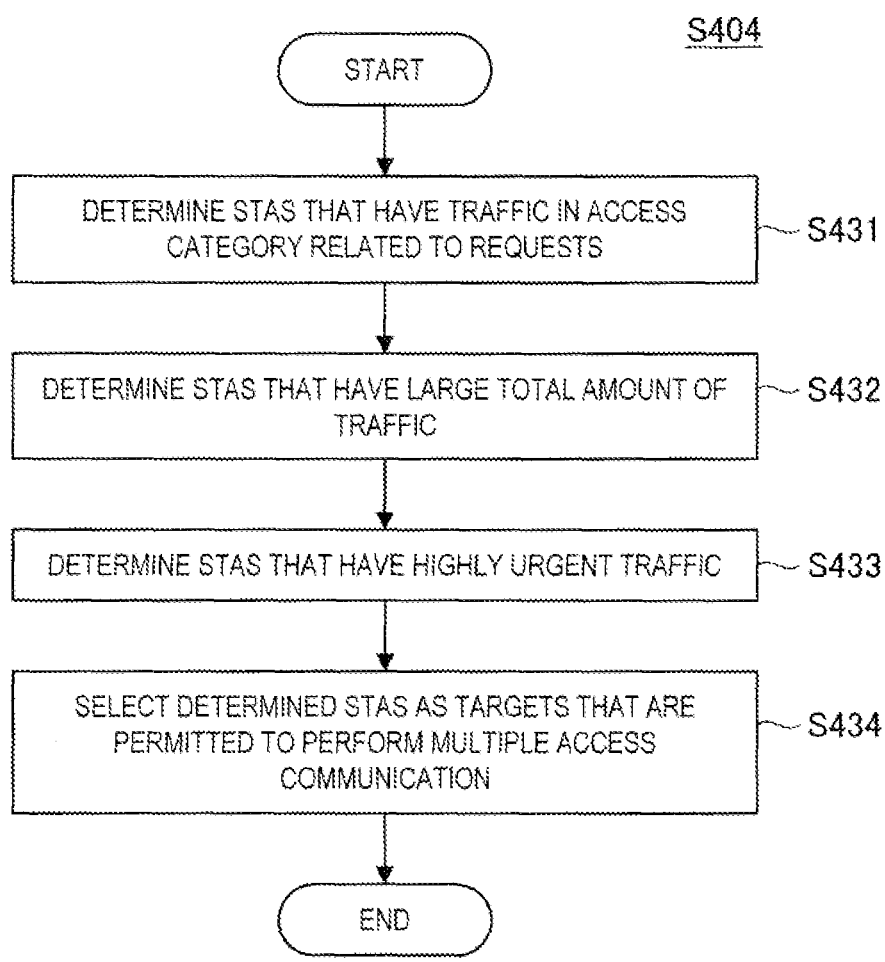
FIG. 9 is a flowchart conceptually illustrating an example of processing of deciding targets that are permitted to perform multiple access communication in the AP according to the embodiment.

Next, processing of deciding targets that are permitted to perform multiple access communication in the AP 200-1 will be described with reference to FIG. 9. FIG. 9 is a flowchart conceptually illustrating an example of processing of deciding targets that are permitted to perform multiple access communication in the AP 200-1 according to the embodiment.

The AP 200-1 determines the STAs 100-1 that have traffic in the access category related to the requests (Step S431). Specifically, the control unit 230 determines whether or not the respective STAs 100-1 that have responded with traffic information have traffic that belongs to the access category of the requests to the STAs 100-1.

Also, the AP 200-1 determines the STAs 100-1 with large total amounts of traffic (Step S432). Specifically, the control unit 230 determines whether or not the total amount of traffic of each STA 100-1 that has responded with the traffic information is equal to or greater than a threshold value or is greater than those of the other STAs 100-1.

In addition, the AP 200-1 determines the STAs 100-1 that have highly urgent traffic (Step S433). Specifically, the control unit 230 determines whether or not the respective STAs 100-1 that have responded with the traffic information have traffic regarding urgency or whether or not the number of traffic is equal to or greater than a threshold value or greater than those of the other STAs 100-1.

Then, the AP 200-1 selects the determined STAs 100-1 as targets that are permitted to perform multiple access communication (Step S434). Specifically, the control unit 230 selects the determined STAs 100-1 as members of the multiple access communication group.

(Processing of STA)

Figure 10:
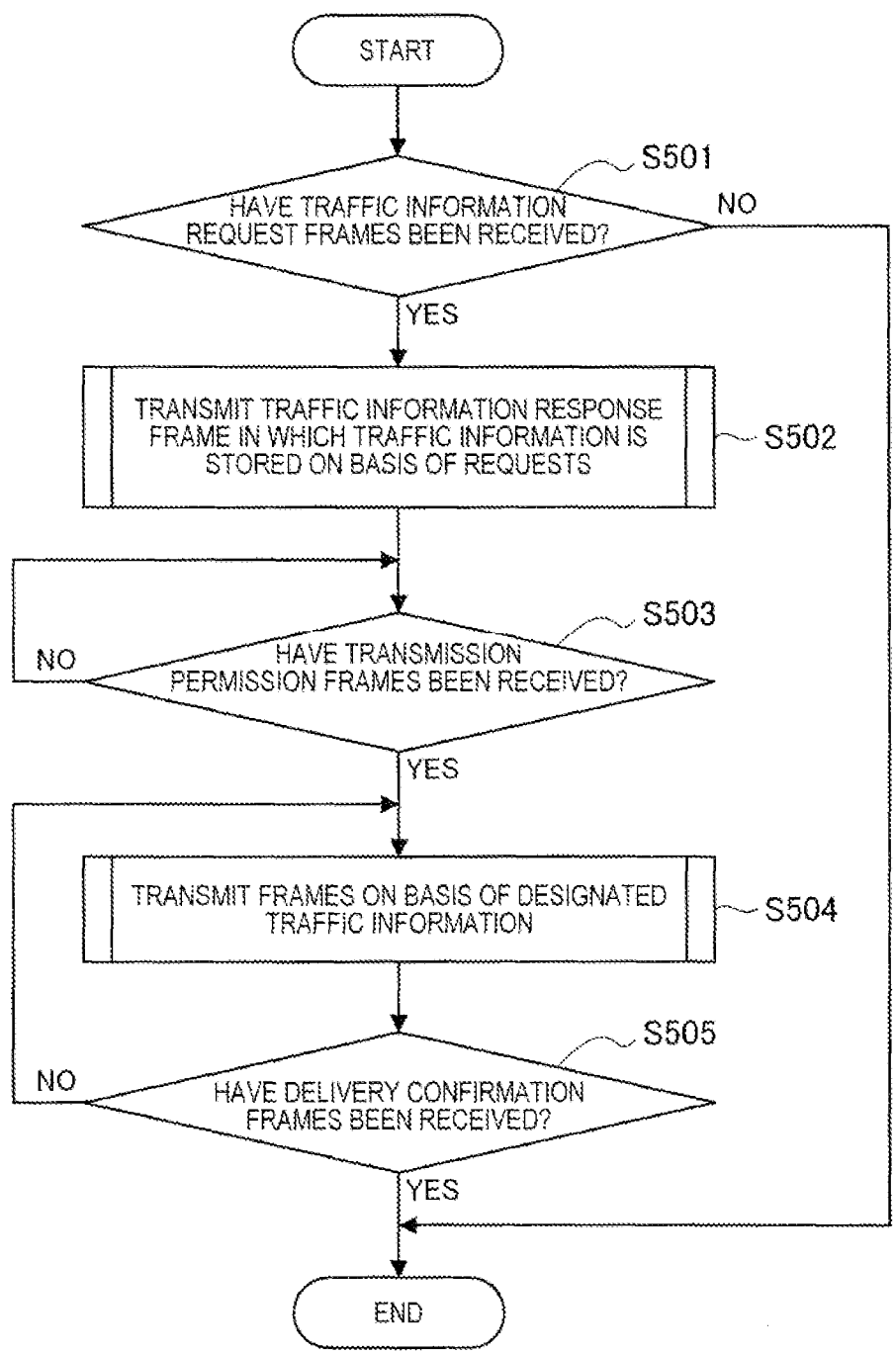
FIG. 10 is a flowchart conceptually illustrating an example of overall processing of the STA according to the embodiment.

Next, overall processing of each STA 100-1 will be described with reference to FIG. 10. FIG. 10 is a flowchart conceptually illustrating an example of overall processing performed by the STA 100-1 according to the embodiment.

The STA 100-1 determines whether or not a traffic information request frame has been received (Step S501). Specifically, the data processing unit 110 determines whether or not a traffic information request frame has been received by the wireless communication unit 120.

If it is determined that the traffic information request frame has been received (Step S501/YES), the STA 100-1 transmits a traffic information response frame in which traffic information is stored, on the basis of the request (Step S502). Specifically, the data processing unit 110 acquires requested traffic information from the traffic information request frame received by the wireless communication unit 120, and the control unit 130 generates traffic information on the basis of the acquired requested traffic information. Then, the control unit 130 causes the data processing unit 110 to generate the traffic information response frame in which the generated traffic information is stored, and the generated traffic information response frame is transmitted by the wireless communication unit 120. Note that details will be described later.

Thereafter, the STA 100-1 determines whether or not transmission permission frame has been received (Step S503). Specifically, the data processing unit 110 determines whether or not a trigger frame, which the STA 100-1 itself is a target that is permitted to transmit, has been received by the wireless communication unit 120.

If it is determined that the transmission permission frame has been received (Step S503/YES), the STA 100-1 transmits a frame on the basis of a designated traffic (Step S504). Specifically, the data processing unit 110 acquires designated traffic information and designated communication parameter information from the received trigger frame, which the STA 100-1 itself is a target that is permitted to transmit, and the control unit 130 transmits a frame by using the acquired designated traffic information and designated communication parameter information. Note that details will be described later.

Thereafter, in a case in which it is determined that the delivery confirmation frame has been received (Step S505/YES), the STA 100-1 stops retransmission of the frame. Meanwhile, in a case in which it is determined that the delivery confirmation frame has not been received (Step S505/NO), the processing is returned to Step S504 for retransmitting the frame.

Figure 11:
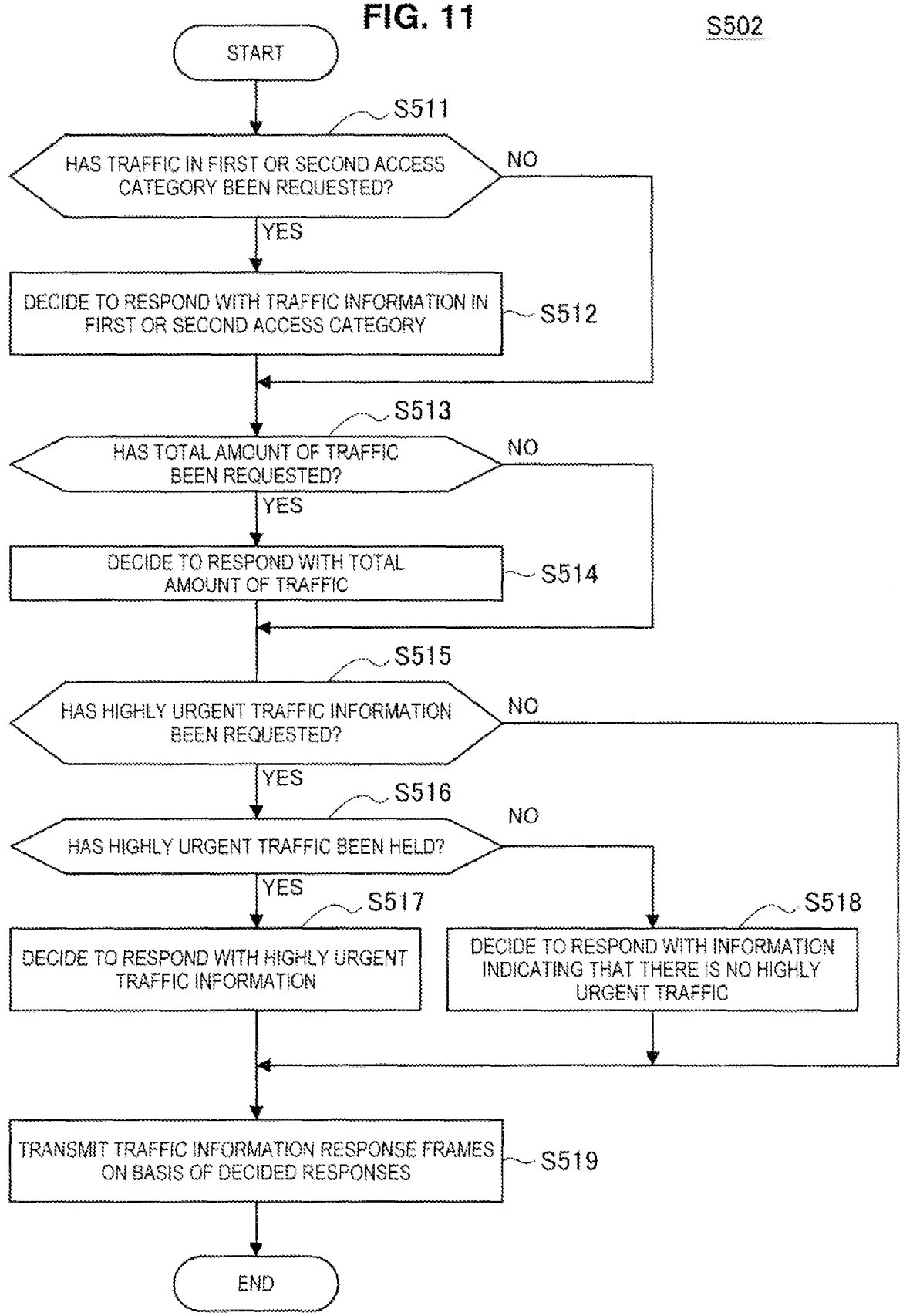
FIG. 11 is a flowchart conceptually illustrating an example of processing of transmitting a traffic information response frame in an STA according to the embodiment.

Next, processing of transmitting a traffic information response frame in the STA 100-1 will be described with reference to FIG. 11. FIG. 11 is a flowchart conceptually illustrating an example of processing of transmitting a traffic information response frame in the STA 100-1 according to the embodiment.

The STA 100-1 determines whether or not traffic information in the first or second access category has been requested (Step S511). Specifically, the control unit 130 determines whether or not traffic information has been requested for both the essential AC and the arbitrary AC or only for the essential AC, from the requested traffic information.

If it is determined dial the traffic information in the first or second access category has been requested (Step S511/YES), the STA 100-1 decides to respond with the traffic information in the first or second access category (Step S512). Specifically, the control unit 130 searches for traffic that belongs to the essential AC or the arbitrary AC and generates traffic information indicating whether or not a discovered traffic is present or the amount thereof.

In addition, the STA 10-1 determines whether or not the total amount of traffic has been requested (Step S513). Specifically, the control unit 130 determines whether or not the total amount of traffic has been requested, from the requested traffic information.

If it is determined that the total amount of traffic has been requested (Step S513/YES), the STA 100-1 decides to respond with the total amount of traffic (Step S514). Specifically the control unit 130 calculates the total amount of traffic and generates traffic information indicating the calculated value.

In addition, the STA 100-1 determines whether or not highly urgent traffic information has been requested (Step S515). Specifically, the control unit 130 determines whether or not traffic information regarding traffic that will be discarded in a time that is equal to or less than a threshold value, traffic with an allowable delay time that is equal to or less than a threshold value, traffic related to communication control, or traffic designated by a higher communication layer has been requested, from the requested traffic information.

If it is determined that highly urgent traffic information has been requested (Step S515/YES), the STA 100-1 determines whether or not a highly urgent traffic has been held (Step S516). Specifically the control unit 130 searches for traffic that meets the aforementioned conditions.

If it is determined that a highly urgent traffic has been held (Step S516/YES), the STA 100-1 decides to respond with highly urgent traffic information (Step S517). Meanwhile, if it is determined that a highly urgent traffic has not been held (Step S516/NO), the STA 100-1 decides to respond with traffic information indicating that there is no highly urgent traffic (Step S518). Specifically, in a case in which traffic that meets the condition has been discovered through the search, the control unit 130 calculates the amount of the traffic and generates traffic information indicating presence of the traffic regarding urgency and the amount thereof. Meanwhile, in a case in which the traffic that meets the condition has not been discovered through the search, the control unit 130 generates traffic information in which all bits are zero, for example, as information indicating that there is no requested traffic.

Then, the STA 100-1 transmits a traffic information response frame on the basis of the decided response (Step S519). Specifically, the control unit 130 causes the data processing unit 110 to generate a traffic information response frame that has the generated traffic information as an information element, and the generated traffic information response frame is transmitted by the wireless communication unit 120.

Figure 12:
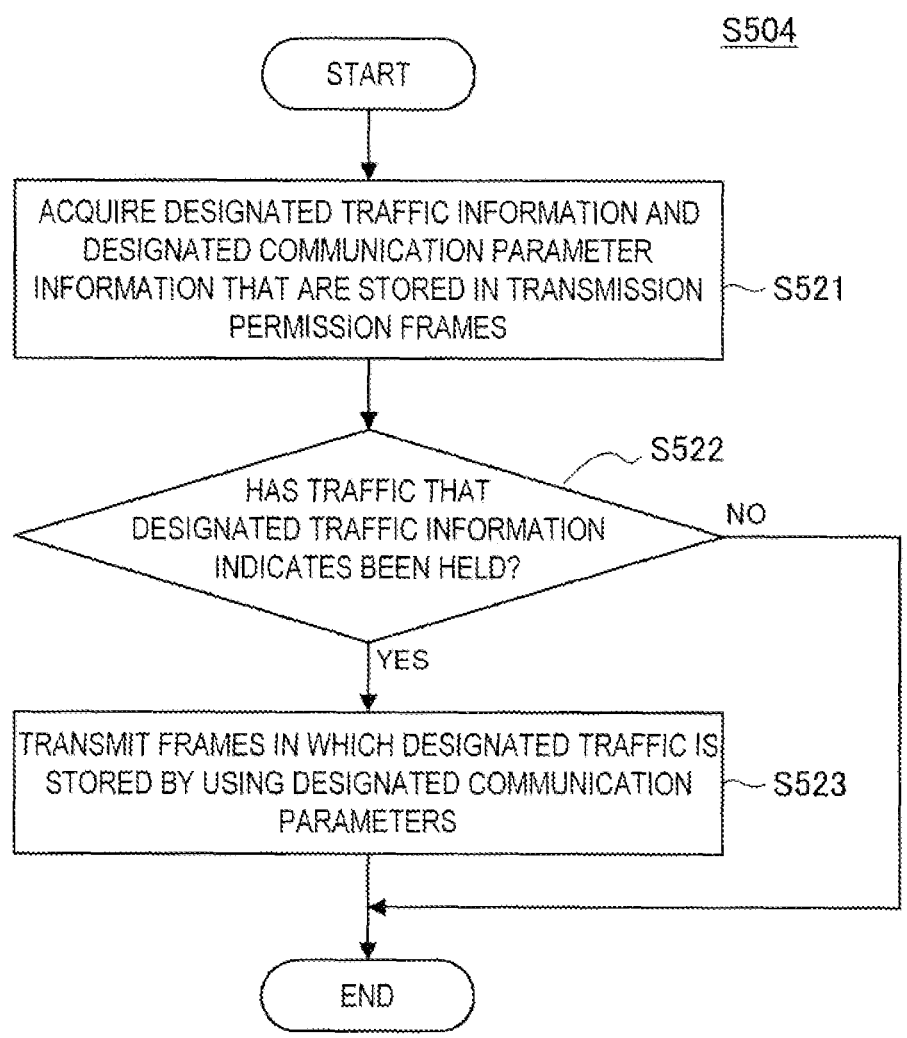
FIG. 12 is a flowchart conceptually illustrating an example of processing of transmitting a frame based on designated traffic in the STA according to the embodiment.

Next, processing of transmitting a frame based on a designated traffic in the STA 100-1 will be described with reference to FIG. 12. FIG. 12 is a flowchart conceptually illustrating an example of processing of transmitting a frame based on a designated traffic in the STA 100-1 according to the embodiment.

The STA 100-1 acquires designated traffic information and designated communication parameter information stored in a transmission permission frame (Step S521). Specifically, the data processing unit 110 acquires the designated traffic information and the designated communication parameter information from a received trigger frame.

Next, the STA 100-1 determines whether or not traffic that the designated traffic information indicates has been held (Step S522). Specifically, the control unit 130 determines whether or not the traffic has been buffered, by searching for the traffic that the designated traffic information indicates.

If it is determined that the traffic that the designated traffic information indicates has been held (Step S522/YES), the STA 100-1 transmits a frame in which the designated traffic is stored by using designated communication parameter information (Step S523). Specifically, the control unit 130 causes the data processing unit 110 to generate a frame in which the traffic discovered through the search is stored. In addition, the control unit 130 sets communication parameters such as transmission power and MCS on the basis of the acquired designated communication parameter information. Then, the wireless communication unit 120 transmits the frame generated with set communication parameters. Note that traffic other than the designated traffic may be stored in the frame.

3.3. Summary of First Embodiment

According to the first embodiment of the present disclosure, the AP 200-1 transmits request frames that indicate requests for traffic information and receives response frames in which the traffic information is stored as described above. Then, the AP 200-1 controls transmission of frames related to permission of transmission directed to STAs 100-1 that are identified on the basis of the traffic information stored in the received response frames and are allowed to perform multiple access. In addition, the STAs 100-1 receive the aforementioned request frames and transmit response frames in response to the received request frames. Then, the STAs 100-1 control transmission of frames related to the traffic information on the basis of communication parameters related to multiple access, which are stored in the frames related to the permission of transmission received after the transmission of the response frames.

Conventionally, a group that is permitted to perform, transmission without taking properties of traffic into consideration is formed in multiple access communication.

Therefore, there is a concern that traffic with higher priority or urgency may not be transmitted, delivery of the traffic may thus be delayed, or the traffic may be discarded.

Meanwhile, according to the embodiment, it is possible to form a multiple access communication group on the basis of collected traffic information when multiple access communication is performed. That is, the multiple access communication group is formed in consideration of traffic. Therefore, it is possible to secure fairness in relation to properties of traffic such as priority or urgency. Accordingly, it becomes possible to suppress disruption of delivery of traffic in wireless LAN communication.

In addition, the aforementioned traffic information includes information indicating whether or not specific traffic is present. Therefore, it is possible to reduce the size of the traffic information. Also, it is possible to store the traffic information in vacant fields in existing frames since the size thereof is reduced. Therefore, it is possible to reduce the number and the sizes of the frames. Accordingly, it becomes possible to suppress an increase in the amount of communication for the traffic information.

In addition, the aforementioned specific traffic includes traffic in accordance with specific priority. Therefore, it is possible to decide traffic that is permitted to be transmitted in accordance with the priority. Accordingly it becomes possible to effectively suppress disruption such as delay of traffic.

In addition, the aforementioned specific traffic includes traffic related to urgency of delivery. Therefore, it is possible to cause more highly urgent traffic than the other traffic to be delivered in multiple access communication. Accordingly, it is possible to avoid crucial disruption in delivery of traffic.

In addition, the aforementioned traffic related to urgency include traffic that will be discarded in times that are equal to or less than a threshold value. Here, if the traffic is discarded, overhead is needed to retransmit the traffic in a case in which the traffic is retransmitted. Also, processing using the traffic is disrupted in a case in which the traffic is not retransmitted. Thus, the wireless communication system according to the embodiment is adapted such that traffic that is discarded in shorter times is delivered with higher priority in multiple access communication. In this manner, it is possible to suppress failure of overhead needed to deliver traffic or failure of delivery of traffic.

In addition, the aforementioned traffic related to urgency includes traffic with allowable delay that is equal to or less than a threshold value. Here, there is a concern that even if the traffic has not been discarded, the traffic is not used in processing when delay that is equal to or greater than an allowable time occurs. Therefore, disruption that is similar to that in a case in which the traffic is discarded may occur as a result. Thus, the wireless communication system according to the embodiment is adapted such that traffic with shorter allowable delay times is delivered with higher priority in multiple access communication. In this manner, it is possible to suppress a concern that the traffic is wasted.

In addition, the aforementioned traffic related to urgency includes traffic related to communication control. Therefore, it is possible to suppress occurrence of waste of communication processing by the traffic related to communication control being smoothly delivered. Accordingly, it is possible to communicate data traffic and the like without any trouble and to suppress degradation of communication efficiency.

In addition, the aforementioned traffic related to urgency includes traffic that is designated by generation sources of the traffic. Therefore, it is possible to deliver the traffic with urgency that is difficult to be determined in terms of standards or attributes of communication with higher priority in multiple access communication. Accordingly, it is possible to suppress a concern that operations of the higher communication layer, such as an application, is caused to stop.

In addition, the aforementioned traffic information includes information indicating the amount of the aforementioned traffic. Therefore, it is possible to determine which of specific traffic is to be delivered with priority in multiple access communication in a case in which a plurality of types of specific traffic are present. Accordingly, it is possible to prevent traffic from remaining and to secure fairness in delivery of the traffic.

In addition, the aforementioned traffic information includes information indicating the total amount of traffic that the STAs 100-1 hold. Therefore, it is possible to avoid excessive remaining of traffic in a case in which a lot of traffic with lower priority or lower urgency than those of the other traffics has been buffered. Accordingly, it is possible to suppress unfairness of delivery opportunities of the traffic.

In addition, the STAs 100-1 identified on the basis of the aforementioned traffic information include STAs 100-1 that hold traffic identified from the traffic information. Therefore, it is possible to permit the STAs 100-1 that have traffic that is desired to be delivered with priority to perform multiple access communication. Accordingly, it is possible to deliver more traffic at once as compared with a case in which the traffic is delivered through single access communication.

In addition, designated traffic information indicating traffic that the STAs 100-1 are caused to transmit is stored in the aforementioned frames related to permission of transmission, and the STAs 100-1 control transmission of the aforementioned frames related to traffic information in which traffic indicated by the designated traffic information is stored. Accordingly, it is possible to cause the STAs 100-1 to more reliably transmit traffic that is desired to be delivered with priority.

In addition, the aforementioned response frames include frames that are communicated for a purpose other than communication of the aforementioned traffic information. Therefore, it is possible to reduce the amount of communication as compared with a case in which frames dedicated to communication of the traffic information are prepared.

In addition, the aforementioned multiple access includes space division multiple access. Therefore, it is possible to enhance fairness of delivery of traffic while improving communication efficiency. Note that the multiple access may be frequency division multiple access, orthogonal frequency division multiple access, or code division multiple access.

4. Second Embodiment

Next, a second embodiment of the present disclosure will be described. In the second embodiment, an AP 200-1 changes a multiple access communication group on the basis of a result of multiple access communication based on traffic information.

4.1. Functions of Device

First, the respective functions of each STA 100-2 and the AP 200-2 that serve as wireless communication devices according to the embodiment will be described. Note that description of functions that are substantially the same as the functions according to the first embodiment will be omitted.

(Change of Target that is Permitted to Perform Transmission)

If a frame in which traffic that is different from a designated traffic is stored has been received through multiple access communication, the AP 200-2 excludes a transmission source of the frame from targets that are permitted to perform transmission. Specifically, a control unit 230 determines whether or not traffic that is stored in a frame received through multiple access communication is traffic that designated traffic information provided in a notification using a trigger frame indicates. In a case in which the traffic stored in the received frame is different from the designated traffic, the control unit 230 excludes the STA (hereinafter, also referred to as an alien element STA) that is a transmission source of the frame from the multiple access communication group. Therefore, in a case in which traffic that only the excluded STA 100-2 has is designated by the designated traffic information, the traffic is excluded from the designated traffic information. Notifications of the changed targets that are permitted to perform transmission are provided to STAs 100-1 that are members of the multiple access communication group by using transmission permission frames.

Note that the AP 200-2 may not request traffic information from the alien element STA 100-2. For example, the control unit 230 may exclude the alien element STA 100-2 from destinations of the traffic information request frames. In addition, the AP 200-2 may transmit frames indicating that traffic that is different from the designated traffic has been delivered to the alien element STA 100-2. For example, a delivery confirmation frame in which information indicating that the traffic that is different from the designated traffic has been delivered is stored may be transmitted.

4.2. Flow of Processing

Figure 13:
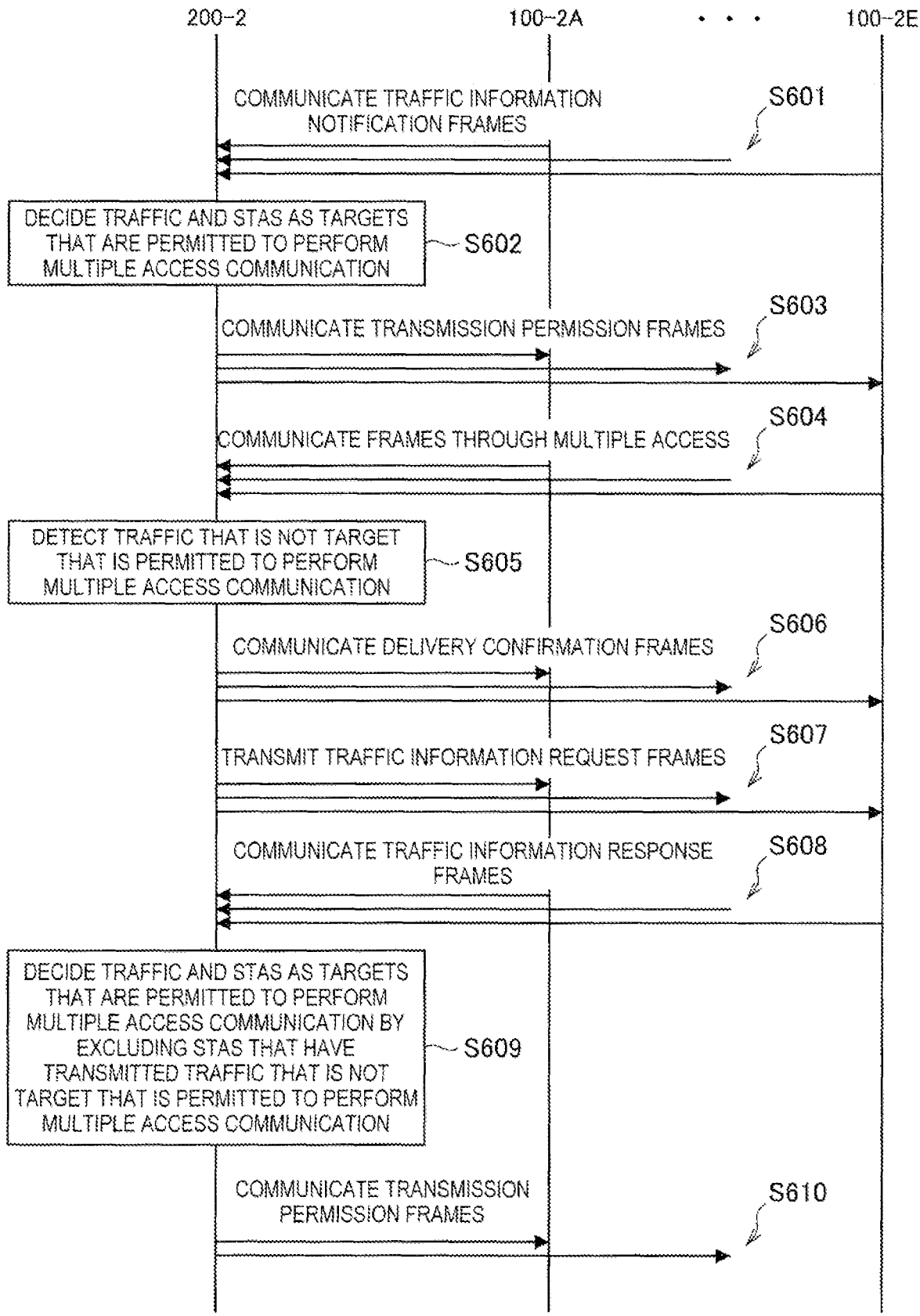
FIG. 13 is a sequence diagram conceptually illustrating an example of processing of the wireless communication system according to a second embodiment of the present disclosure.

Next, a flow of processing performed by the wireless communication system according to the embodiment will be described with reference to FIG. 13. FIG. 13 is a sequence diagram conceptually illustrating an example of processing in the wireless communication system according to the embodiment.

The AP 200-2 receives traffic information notification frames from STA 100-2A to 100-2E by using traffic information request frames (Step S601). Note that the traffic information may be collected by using an existing method defined by communication standards. Next, the AP 200-2 decides traffic and STAs 100-1 that are target that are permitted to perform multiple access communication on the basis of the traffic information (Step S602) and transmits transmission permission frames to the STAs 100-2A to 100-2E (Step S603). The STAs 100-2A to 100-2E that have received the transmission permission frames transmit frames on the basis of communication parameters that are provided in notifications through the transmission permission frames, and the frames are thus multiplexed (Step S604).

The AP 200-2 that has received the multiplexed frames detects traffic that is not a target that is permitted to perform multiple access communication (Step S605). Next, the AP 200-2 transmits delivery confirmation frames to the STAs 100-2A to 100-2E that are transmission sources of the multiplexed frames (Step S606).

In a case in which next multiple access communication is performed, the AP 200-2 transmits traffic information request frames to the STAs 100-2A to 100-2E (Step S607). The STAs 100-2A to 100-2E that have received the traffic information request frames transmit traffic information response frame to the AP 200-2 (Step S607). Then, the AP 200-2 decides the traffic and the STAs 100-2 serving as targets that are permitted to perform multiple access communication by excluding the STA 100-2E that has transmitted traffic that is not the target that is permitted to perform multiple access communication (Step S609). Then, the AP 200-2 transmits transmission permission frames to the STAs 100-2A to 100-2D that are the decided targets of the permission (Step S610).

(Processing of AP)

Figure 14:
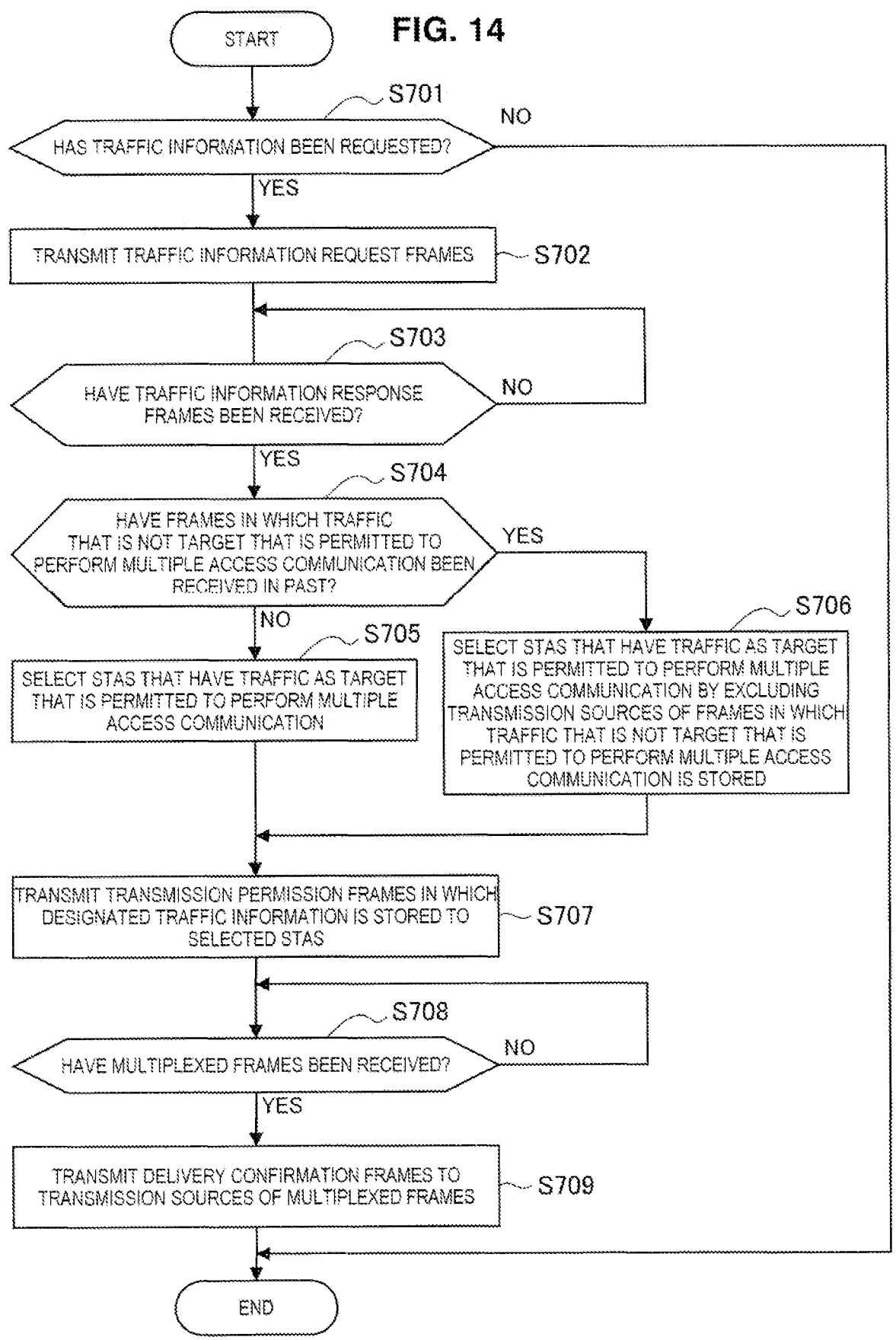
FIG. 14 is a flowchart conceptually illustrating an example of overall processing of the AP according to the embodiment.

Next, overall processing of the AP 200-2 will be described with reference to FIG. 14. FIG. 14 is a flowchart conceptually illustrating an example of overall processing of the AP 200-2 according to the embodiment. Note that description of processing that is substantially the same as the processing according to the first embodiment will be omitted.

If it is determined to request traffic information (Step S701/YES), the AP 200-2 transmits traffic information request frames (Step S702).

Thereafter, if the traffic information response frames have been received (Step S703/YES), the AP 200-2 determines whether or not frames in which traffic that is not a target that is permitted to perform multiple access communication has been received in the past (Step S704). Specifically, the control unit 230 determines whether or not traffic that has not teen designated by the designated traffic information has been stored in frames that have been received in the past. Note that the control unit 230 may determine whether or not results of the determination have been recorded.

If it is determined that frames in which traffic that is not a target that is permitted to perform multiple access communication is stored have not been received in the past (Step S704/NO), the AP 200-2 selects the STAs 100-2 that have traffic as a target that is permitted to perform multiple access communication, from among all the STAs 100-1 that have responded with traffic information as targets (Step S705).

Meanwhile, if it is determined that frames in which traffic that is not a target that is permitted to perform multiple access communication is stored have been received in the past (Step S704/YES), the AP 200-2 selects STAs that have traffic as a target that is permitted to perform multiple access communication by excluding transmission sources of the frames in which the traffic that is not the target that is permitted to perform multiple access communication is stored (Step S706). Specifically, the control unit 230 decides members of the multiple access communication group on the basis of the traffic information provided in notifications by excluding the alien element STA 100-2.

Next, the AP 200-2 transmits transmission permission frames in which designated traffic information is stored to the STAs 100-2 (Step S707). If multiplexed frames are received (Step S708/YES), then the AP 200-2 transmits delivery confirmation frames to transmission sources of the multiplexed frames (Step S709).

4.3. Summary of Second Embodiment

In this manner, according to the second embodiment of the present disclosure, the AP 200-2 excludes the transmission sources of the frames in which traffic that is different from the traffic that the designated traffic information indicates is stored from the targets that are permitted to perform transmission. Therefore, it is possible to cause the traffic that the other STAs 100-2 that are different from the alien element STA 100-2 have to be delivered with priority. Accordingly, it is possible to avoid interruption of multiple access communication based on properties of the traffic.

Note that in a case in which frames are not received from some STAs 100-2 in response to a transmission permission frame, the AP 200-2 may similarly exclude the STA 100-2 from the targets that are permitted to perform multiple access communication.

5. Application Example

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules configured by one die).

On the other hand, for example, the AP 200 may be realized as a wireless LAN access point (also referred to as a wireless base station) which has a router function or does not have a router function. The AP 200 may be realized as a mobile wireless LAN router. The AP 200 may also be a wireless communication module (for example, an integrated circuit module configured with one die) mounted on such devices.

5-1. First Application Example

Figure 15:
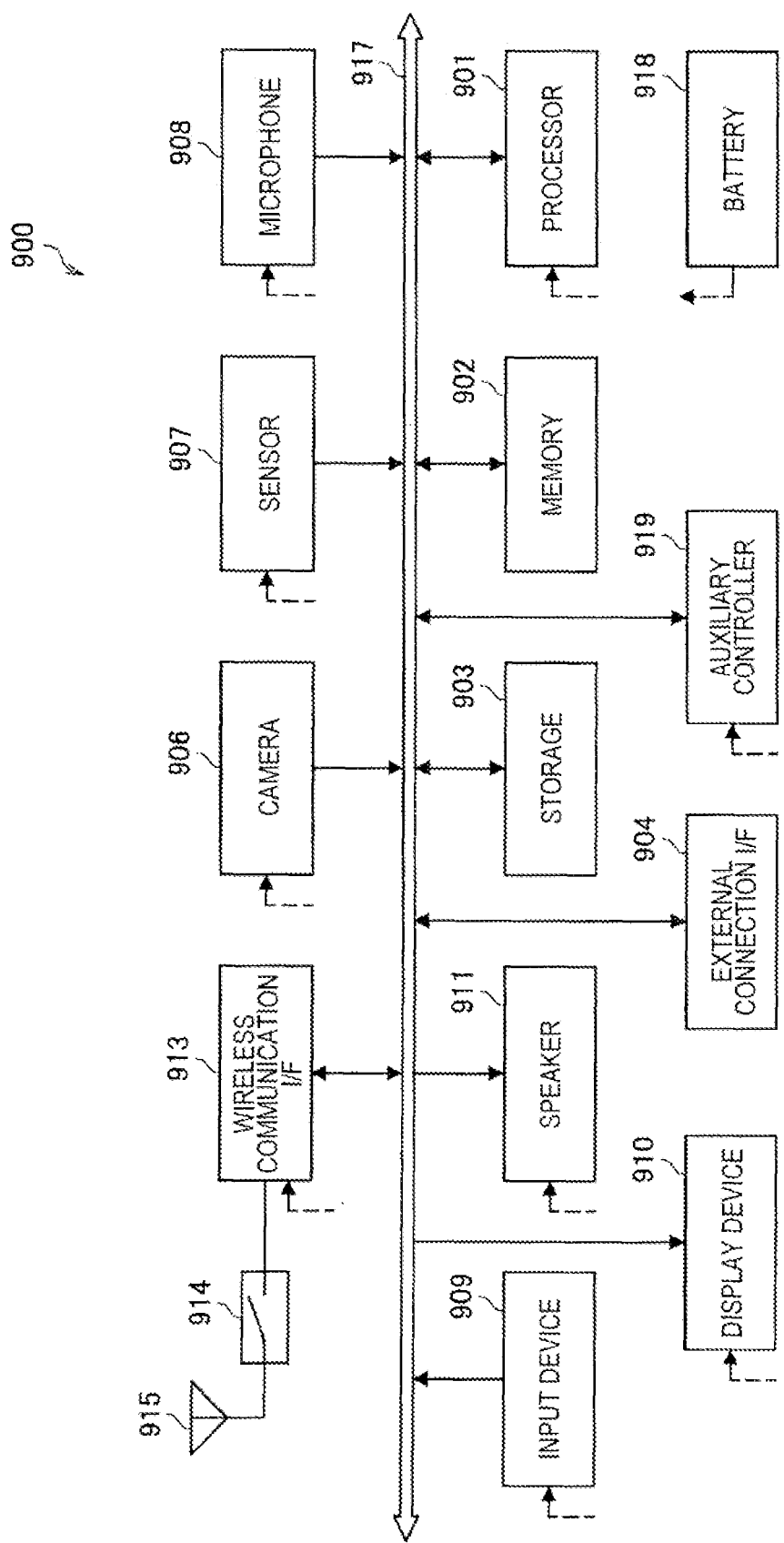
FIG. 15 is a block diagram illustrating an example of a schematic configuration of a smartphone.

FIG. 15 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor; a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 15. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 15 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 15, the data processing unit 110, the wireless communication unit 120, and the control unit 130 described with reference to FIG. 2 may be mounted on the wireless communication interface 913. In addition, at least a part of these functions may be mounted on the processor 901 or the auxiliary controller 919. If a traffic information request frame has been received, for example, the control unit 130 causes the data processing unit 110 to generate a traffic information response frame in which requested traffic information is stored. Then, the generated traffic information response frame is transmitted by the wireless communication unit 120. In this manner; it is possible to perform multiple access communication based on the traffic information between the smartphone 900 and a wireless communication device communicating therewith.

Accordingly, it is possible to suppress disruption of delivery of traffic through wireless LAN communication for the smartphone 900.

Note that the smartphone 900 may operate as a wireless access point (software AP) as the processor 901 executes the function of an access point at an application level. In addition, the wireless communication interface 913 may have the function of a wireless access point.

7-2. Second Application Example

Figure 16:
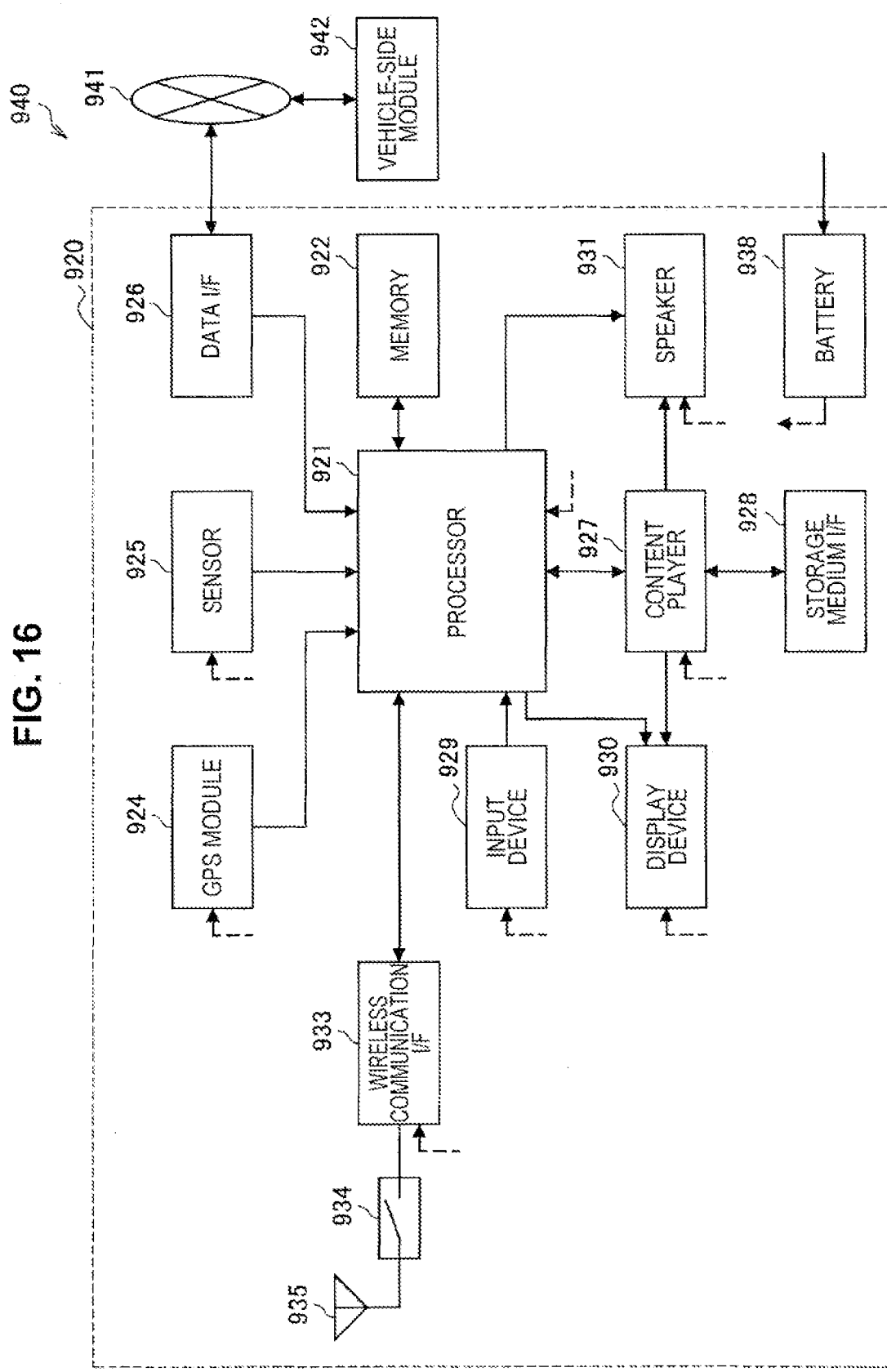
FIG. 16 is a block diagram illustrating an example of a schematic configuration of a car navigation device.

FIG. 16 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 16. In this case, the antenna switch 934 may be omitted from the configuration of the car navigation device 920.

The battery 938 supplies electric power to each of the blocks of the car navigation device 920 illustrated in FIG. 16 via power supply lines partially indicated by dashed lines in the drawing. In addition, the battery 938 accumulates electric power supplied from the vehicle side.

In the car navigation device 920 illustrated in FIG. 16, the data processing unit 110, the wireless communication unit 120, and the control unit 130 described with reference to FIG. 2 may be mounted on the wireless communication interface 933. In addition, at least a part of these functions may be mounted on the processor 921. If a traffic information request frame has been received, for example, the control unit 130 causes the data processing unit 110 to generate a traffic information response frame in which requested traffic information is stored. Then, the generated traffic information response frame is transmitted by the wireless communication unit 120. In this manner, if is possible to perform multiple access communication based on the traffic information between the car navigation device 920 and a wireless communication device communicating therewith. Accordingly, it is possible to suppress disruption of delivery of traffic through wireless LAN communication for the car navigation device 920.

In addition, the wireless communication interface 933 may operate as the aforementioned AP 200 and provide wireless connection to a terminal that a user in a vehicle has. At this time, the control unit 230 transmits a traffic information request frame to the terminal that the user has via the data processing unit 210 and the wireless communication unit 220. Then, it is determined whether or not to permit the terminal that the user has to perform multiple access communication on the basis of the traffic information that is stored in a traffic information response frame received as a response to the traffic information request frame. In this manner, it is possible to perform multiple access communication in consideration of properties of traffic of the terminal that the user has. Accordingly, it is possible to suppress disruption of delivery of traffic through wireless LAN communication for a terminal that communicates with the car navigation device 920.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

5-3. Third Application Example

Figure 17:
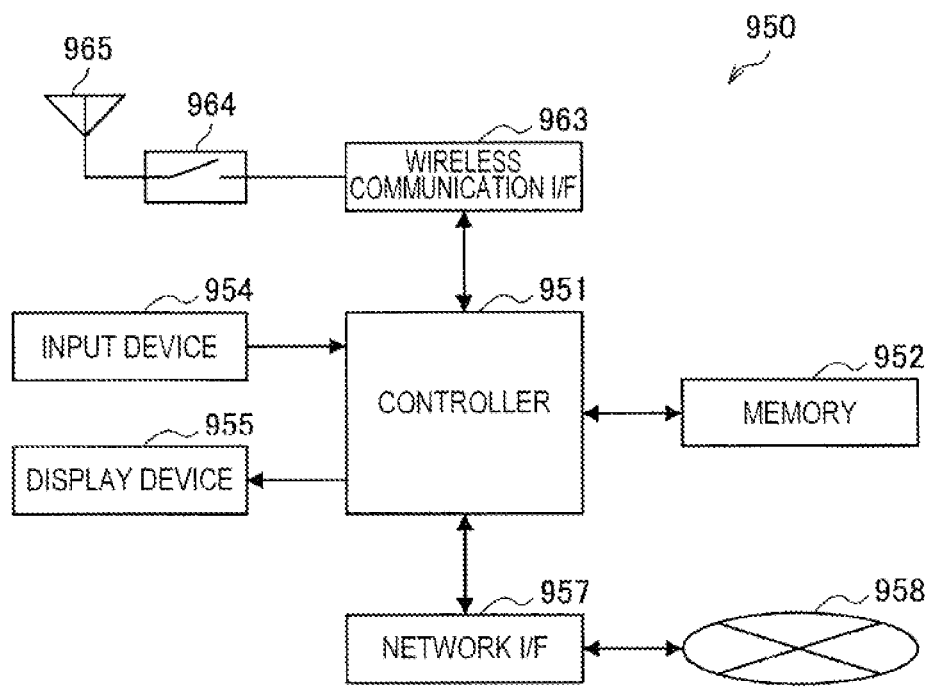
FIG. 17 is a block diagram illustrating an example of a schematic configuration of a wireless access point.

FIG. 17 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

At the wireless access point 950 illustrated in FIG. 17, the data processing unit 210, the wireless communication unit 220, and the control unit 230 that have been described with reference to FIG. 2 may be mounted on the wireless communication interface 963. Also, at least a part of these functions may be mounted on the controller 951. For example, the control unit 230 transmits a traffic information request frame to a terminal that the user has via the data processing unit 210 and the wireless communication unit 220. Then, it is determined whether or not to permit the terminal that the user has to perform multiple access communication on the basis of traffic information that is stored in a traffic information response frame received as a response to the traffic information request frame. In this manner, if is possible to perform multiple access communication in consideration of properties of traffic of the terminal that the user has. Accordingly, it is possible to suppress disruption of delivery of traffic through wireless LAN communication for the terminal that communicates with the car navigation device 920.

6. Conclusion

As described above, according to the first embodiment of the present disclosure, it is possible to form a multiple access communication group on the basis of collected traffic information when multiple access communication is performed. That is, the multiple access communication group is formed in consideration of traffic. Therefore, it is possible to secure fairness in relation to properties of traffic such as priority or urgency. Accordingly, it becomes possible to suppress disruption of delivery of traffic in wireless LAN communication.

In addition, according to the second embodiment of the present disclosure, it is possible to cause the traffic that the other STAs 100-2 that are different from the alien element STA 100-2 have to be delivered with priority. Accordingly, it is possible to avoid interruption of multiple access communication based on properties of the traffic.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the AP 200 and the STAs 100 perform multiple access communication in the aforementioned embodiments, the present technology is not limited to such an example. For example, an STA 100 that has a direct link to a plurality of STAs 100 and the plurality of STAs 100 may perform multiple access communication. Note that in this case, the aforementioned DL communication can be understood as "simultaneous communication from one device to a plurality of devices" and the aforementioned UL communication can be understood as "simultaneous communication from the plurality of devices to the one device".

In addition, although designated traffic information is assumed to be stored in transmission permission frames in the aforementioned embodiments, the present technology is not limited to such an example. For example, notifications of the designated traffic information may not be provided to the STAs 100, and the STAs 100 may transmit frames that have traffic related to traffic information with which requests have been responded if transmission permission frames are received.

Also, the aforementioned traffic information may be information indicating remaining times of specific traffic. For example, the traffic information may be information indicating remaining times of traffic that belongs to the essential AC and the like.

Note that the aforementioned information indicating properties of traffic such as priority or the amount of traffic may be information that indicates values themselves related to properties or may be quantum information with which values related to the properties can be specified.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which, are not necessarily chronologically performed but performed in parallel or individually as well. Further, if is needless to say that even in steps which are processed chronologically, the order can be appropriately changed depending on circumstances.

In addition, it is also possible to produce a computer program for causing hardware incorporated in a wireless communication device 100 and a wireless communication device 200 to exhibit functions equivalent to those of the respective functional configurations of the aforementioned wireless communication device 100 and wireless communication device 200. In addition, a storage medium that stores the computer program therein is also provided.

Additionally, the present technology may also be configured as below.

(1)

A wireless communication device including:

a transmission unit that transmits a request frame indicating a request for traffic information;

a receiving unit that receives a response frame in which the traffic information is stored; and a control unit that controls transmission of a frame related to permission of transmission directed to a first wireless communication device that is identified on the basis of the traffic information stored in the received response frame and that is permitted to perform multiple access.

(2)

The wireless communication device according to (1), in which the traffic information includes information indicating whether or not there is specific traffic.

(3)

The wireless communication device according to (2), in which the specific traffic includes traffic corresponding to a specific priority.

(4)

The wireless communication device according to (2) or (3), in which the specific traffic includes traffic related to urgency of delivery.

(5)

The wireless communication device according to (4), in which the traffic related to urgency includes traffic that is discarded in a time that is equal to or less than a threshold value.

(6)

The wireless communication device according to (4) or (5), in which the traffic related to urgency includes traffic with an allowable delay that is equal to or less than a threshold value.

(7)

The wireless communication device according to any one of (4) to (6), in which the traffic related to urgency includes traffic related to communication control.

(8)

The wireless communication device according to any one of (4) to (7), in which the traffic related to urgency includes traffic designated by a generation source of the traffic.

(9)

The wireless communication device according to any one of (2) to (8), in which the traffic information includes information indicating an amount of the specific traffic.

(10)

The wireless communication device according to any one of (1) to (9), in which the traffic information includes information indicating a total amount of traffic that the first wireless communication device holds.

(11)

The wireless communication device according to any one of (1) to (9), in which the first wireless communication device identified on the basis of the traffic information includes a first wireless communication device that holds traffic identified from the traffic information.

(12)

The wireless communication device according to any one of (1) to (11), in which designated traffic information indicating traffic that the first wireless communication device is caused to transmit is stored in the frame related to permission of transmission.

(13)

The wireless communication device according to (12), in which the control unit excludes a transmission source of a frame in which traffic that is different from the traffic indicated by the designated traffic information is stored, as a target that is permitted to perform transmission.

(14)

The wireless communication device according to any one of (1) to (13), in which the multiple access includes orthogonal frequency division multiple access or space division multiple access.

(15)

A wireless communication device including:

a receiving unit that receives a request frame indicating a request for traffic information;

a transmission unit that transmits a response frame in which the traffic information is stored in response to the received request frame; and a control unit that controls transmission of a frame related to the traffic information on the basis of a communication parameter related to multiple access, which are stored in a frame related to permission of transmission that is received after the transmission of the response frame.

(16)

The wireless communication device according to (15), in which designated traffic information indicating traffic is stored in the frame related to permission of transmission, and traffic that the designated traffic information indicates is stored in the frame related to the traffic information.

(17)

The wireless communication device according to (15) or (16), in which the response frame includes a frame communicated for a purpose other than communication of the traffic information.

(18)

A wireless communication method including, using a processor:

transmitting a request frame that indicates a request for traffic information;

receiving a response frame in which the traffic information is stored; and controlling transmission of a frame related to permission of transmission directed to a first wireless communication device that is identified on the basis of the traffic information stored in the received response frame and that is permitted to perform multiple access.

(19)

A wireless communication method including, using a processor:

receiving a request frame indicating a request for traffic information;

transmitting a response frame in which the traffic information is stored in response to the received request frame; and controlling transmission of a frame related to the traffic information on the basis of a communication parameter related to multiple access, which are stored in a frame related to permission of transmission that is received after the transmission of the response frame.

REFERENCE SIGNS LIST

100 STA
200 AP
110, 210 data processing unit
120, 220 wireless communication unit
130, 230 control unit

The invention claimed is:

1. A wireless communication device comprising:
circuitry configured to
transmit a request frame indicating a request for traffic information, the traffic information including information indicating whether or not there is specific traffic, the specific traffic including traffic related to urgency of delivery and communication control;
receive a response frame in which the traffic information is stored; and
control transmission of a frame related to permission of transmission directed to a first wireless communication device that is identified on a basis of the traffic information stored in the received response frame and that is permitted to perform multiple access.

2. The wireless communication device according to claim 1, wherein the specific traffic includes traffic corresponding to a specific priority.

3. The wireless communication device according to claim 1, wherein the traffic related to urgency includes traffic that is discarded in a time that is equal to or less than a threshold value.

4. The wireless communication device according to claim 1, wherein the traffic related to urgency includes traffic with an allowable delay that is equal to or less than a threshold value.

5. The wireless communication device according to claim 1, wherein the traffic related to urgency includes traffic designated by a generation source of the traffic.

6. The wireless communication device according to claim 1, wherein the traffic information includes information indicating an amount of the specific traffic.

7. The wireless communication device according to claim 1, wherein the traffic information includes information indicating a total amount of traffic that the first wireless communication device holds.

8. The wireless communication device according to claim 1, wherein the first wireless communication device identified on a basis of the traffic information includes a first wireless communication device that holds traffic identified from the traffic information.

9. The wireless communication device according to claim 1, wherein designated traffic information indicating traffic that the first wireless communication device is caused to transmit is stored in the frame related to permission of transmission.

10. The wireless communication device according to claim 9, wherein the control unit excludes a transmission source of a frame in which traffic that is different from the traffic indicated by the designated traffic information is stored, as a target that is permitted to perform transmission.

11. The wireless communication device according to claim 1, wherein the multiple access includes orthogonal frequency division multiple access or space division multiple access.

12. A wireless communication device comprising:
circuitry configured to
receive a request frame indicating a request for traffic information the traffic information including information indicating whether or not there is specific traffic, the specific traffic including traffic related to urgency of delivery and communication control;
transmit a response frame in which the traffic information is stored in response to the received request frame; and
control transmission of a frame related to the traffic information on a basis of a communication parameter related to multiple access, which are stored in a frame related to permission of transmission that is received after the transmission of the response frame.

13. The wireless communication device according to claim 12,
wherein designated traffic information indicating traffic is stored in the frame related to permission of transmission, and
traffic that the designated traffic information indicates is stored in the frame related to the traffic information.

14. The wireless communication device according to claim 12, wherein the response frame includes a frame communicated for a purpose other than communication of the traffic information.

15. A wireless communication method comprising, using a processor:
transmitting a request frame that indicates a request for traffic information, the traffic information including information indicating whether or not there is specific traffic, the specific traffic including traffic related to urgency of delivery and communication control;
receiving a response frame in which the traffic information is stored; and
controlling transmission of a frame related to permission of transmission directed to a first wireless communication device that is identified on a basis of the traffic information stored in the received response frame and that is permitted to perform multiple access.

16. A wireless communication method comprising, using a processor:
receiving a request frame indicating a request for traffic information, the traffic information including information indicating whether or not there is specific traffic, the specific traffic including traffic related to urgency of delivery and communication control;
transmitting a response frame in which the traffic information is stored in response to the received request frame, and
controlling transmission of a frame related to the traffic information on a basis of a communication parameter related to multiple access, which are stored in a frame related to permission of transmission that is received after the transmission of the response frame.

* * * * *